United States Patent
Foley et al.

(10) Patent No.: US 12,271,395 B2
(45) Date of Patent: *Apr. 8, 2025

(54) FOCUSING UNSTRUCTURED DATA AND GENERATING FOCUSED DATA DETERMINATIONS FROM AN UNSTRUCTURED DATA SET

(71) Applicant: Optum Services (Ireland) Limited, Dublin (IE)

(72) Inventors: Colum Foley, County Dublin (IE); Paul Ferguson, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,602

(22) Filed: Jan. 12, 2023

(65) Prior Publication Data
US 2024/0078245 A1 Mar. 7, 2024

Related U.S. Application Data

(63) Continuation of application No. 18/153,439, filed on Jan. 12, 2023.
(Continued)

(51) Int. Cl.
*G06F 7/00* (2006.01)
*G06F 16/25* (2019.01)
(Continued)

(52) U.S. Cl.
CPC .......... *G06F 16/258* (2019.01); *G06N 20/00* (2019.01); *G06Q 40/08* (2013.01)

(58) Field of Classification Search
CPC ...... G06F 16/258; G06F 16/27; G06F 16/213; G06F 16/215; G06F 16/2237;
(Continued)

(56) References Cited

U.S. PATENT DOCUMENTS

| 10,102,340 B2 | 10/2018 | Tanner, Jr. et al. |
| 10,319,468 B2 | 6/2019 | Ginsburg |

(Continued)

FOREIGN PATENT DOCUMENTS

| CN | 108334935 A | 7/2018 |
| CN | 109636061 A | 4/2019 |

(Continued)

OTHER PUBLICATIONS

Jain, Ankit. "Claim Analysis and Fraud Detection Using Business Intelligence|Blog," Nalashaa, Feb. 2, 2017, (3 pages), [Retrieved from the Internet Oct. 7, 2022] <URL: https://www.nalashaa.com/claim-analysis-fraud-detection-business-intelligence/.

(Continued)

*Primary Examiner* — Mohammad A Sana
(74) *Attorney, Agent, or Firm* — Alston & Bird LLP

(57) ABSTRACT

Each year, almost 10% of claims are denied by payers (i.e., health insurance plans). With the cost to recover these denials and underpayments, predicting payer response (likelihood of payment) from claims data with a high degree of accuracy and precision is anticipated to improve healthcare staffs' performance productivity and drive better patient financial experience and satisfaction in the revenue cycle (Barkholz, 2017). However, constructing advanced predictive analytics models has been considered challenging in the last twenty years. That said, we propose a (low-level) context-dependent compact representation of patients' historical claim records by effectively learning complicated dependencies in the (high-level) claim inputs. Built on this new latent representation, we demonstrate that a deep learning-based framework, Deep Claim, can accurately predict various responses from multiple payers using 2,905,026 de-identified claims data from two US health systems. Deep Claim's improvements over carefully chosen baselines in (Continued)

predicting claim denials are most pronounced as 22.21% relative recall gain (at 95% precision) on Health System A, which implies Deep Claim can find 22.21% more denials than the best baseline system.

20 Claims, 13 Drawing Sheets

Related U.S. Application Data

(60) Provisional application No. 63/374,252, filed on Sep. 1, 2022.

(51) Int. Cl.
 *G06N 20/00* (2019.01)
 *G06Q 40/08* (2012.01)

(58) Field of Classification Search
 CPC ......... G06F 16/24566; G06F 16/9535; G06N 20/00; G06N 20/20; G06N 5/04; G06N 3/08
 See application file for complete search history.

(56) References Cited

U.S. PATENT DOCUMENTS

| | | | |
|---|---|---|---|
| 10,552,576 | B2 | 2/2020 | Campbell |
| 11,049,594 | B2 | 6/2021 | Chintamaneni et al. |
| 11,361,381 | B1 | 6/2022 | Lehmuth et al. |
| 2011/0258054 | A1 | 10/2011 | Pandey et al. |
| 2013/0006655 | A1 | 1/2013 | Van Arkel et al. |
| 2013/0054259 | A1 | 2/2013 | Wojtusiak et al. |
| 2014/0081652 | A1 | 3/2014 | Klindworth |
| 2016/0239617 | A1 | 8/2016 | Farooq et al. |
| 2016/0253461 | A1 | 9/2016 | Sohr et al. |
| 2017/0017760 | A1 | 1/2017 | Freese et al. |
| 2017/0322930 | A1 | 11/2017 | Drew |
| 2019/0034589 | A1 | 1/2019 | Chen et al. |
| 2020/0013124 | A1* | 1/2020 | Obee ............... G06N 20/00 |
| 2020/0104731 | A1 | 4/2020 | Oliner et al. |
| 2020/0311601 | A1 | 10/2020 | Robinson et al. |
| 2020/0381090 | A1 | 12/2020 | Apostolova et al. |
| 2021/0056113 | A1 | 2/2021 | Mac et al. |
| 2021/0109915 | A1 | 4/2021 | Godden et al. |
| 2021/0304749 | A1 | 9/2021 | Singh et al. |
| 2021/0313022 | A1 | 10/2021 | Chaballout |
| 2022/0012611 | A1* | 1/2022 | Moradi ............... G06N 20/20 |
| 2022/0309592 | A1 | 9/2022 | Zahora et al. |
| 2022/0392048 | A1* | 12/2022 | Henry ............... G06N 3/08 |
| 2023/0048097 | A1* | 2/2023 | Clausen ............... G06T 5/70 |
| 2023/0101817 | A1 | 3/2023 | Sinha et al. |
| 2023/0131694 | A1* | 4/2023 | Saber ............... G06N 3/0455 370/252 |
| 2023/0195443 | A1* | 6/2023 | Eberlein ............... G06F 8/65 717/170 |
| 2023/0224493 | A1 | 7/2023 | Foley et al. |
| 2023/0385705 | A1* | 11/2023 | Takehara ............... G06N 3/096 |
| 2024/0078609 | A1 | 3/2024 | Foley et al. |
| 2024/0078610 | A1* | 3/2024 | Foley ............... G06Q 40/08 |

FOREIGN PATENT DOCUMENTS

| | | |
|---|---|---|
| CN | 116070630 A | 5/2023 |
| WO | 2022/057057 A1 | 3/2022 |

OTHER PUBLICATIONS

Kim, Byung-Hak et al. "Deep Claim: Payer Response Prediction From Claims Data With Deep Learning," arXiv preprint arXiv:2007.06229v1 [cs.LG], Jul. 13, 2020, (9 pages).

Sowah, Robert A. et al. "Decision Support System (DSS) for Fraud Detection in Health Insurance Claims Using Genetic Support Vector Machines (GSVMs)," Hindawi Journal of Engineering, vol. 2019, Article ID 1432597, pp. 1-19, Sep. 2, 2019, DOI: 10.1155/2019/1432597.

Sun, Xu et al. "Feature-Frequency-Adaptive On-Line Training For Fast and Accurate Natural Language Processing," Computational Linguistics, vol. 40, No. 3, Sep. 1, 2014, pp. 563-586, DOI: 10.1162/COLI_a_00193.

Thesmar, David et al. "Combining The Power Of Artificial Intelligence With The Richness Of Healthcare Claims Data: Opportunities and Challenges," PharmacoEconomics, vol. 37, pp. 745-752, Mar. 8, 2019.

Non-Final Rejection Mailed on Feb. 28, 2024 for U.S. Appl. No. 18/153,624, 5 page(s).

Non-Final Rejection Mailed on Mar. 26, 2024 for U.S. Appl. No. 17/805,340, 19 page(s).

Notice of Allowance and Fees Due (PTOL-85) for U.S. Appl. No. 17/805,340, filed Jul. 26, 2024, 8 pages, United States Patent and Trademark Office, US.

Notice of Allowance and Fees Due (PTOL-85) for U.S. Appl. No. 18/153,624 Mailed on Sep. 6, 2024, 8 pages, United States Patent and Trademark Office, US.

* cited by examiner

FOCUSING UNSTRUCTURED DATA AND GENERATING FOCUSED DATA DETERMINATIONS FROM AN UNSTRUCTURED DATA SET

CROSS-REFERENCE TO RELATED APPLICATIONS

This application is a continuation of and claims priority to U.S. Non-Provisional patent application Ser. No. 18/153,439 filed Jan. 12, 2023, titled "FOCUSING UNSTRUCTURED DATA AND GENERATING FOCUSED DATA DETERMINATIONS FROM AN UNSTRUCTURED DATA SET," which claims priority to U.S. Provisional Patent Application No. 63/374,252, filed Sep. 1, 2022, the contents of which are each incorporated herein by reference in their entireties.

TECHNICAL FIELD

Embodiments of the present disclosure are generally directed to improved mechanisms and user interfaces for processing unstructured data via a machine learning model, and specifically to mechanisms and user interfaces for improved accuracy and efficiency for processing an unstructured data set based on focused data determined from an unstructured data set.

BACKGROUND

In several contexts, a data set is processed to perform one or more data-driven determinations. Often, the data set is processed to automatically predict an outcome of the data-driven determination. Additionally or alternatively, in some contexts, a data set is manually reviewed to enable manual performance of the data-driven determination. While the data set may include any number of data portions, only certain portions of the data set (and/or subportions thereof) may be relevant to the data-driven determination. In some such contexts, the data set may be unstructured such that an identification of the types of data portions and/or data therein is not readily performable without further processing the data set further.

Applicant has discovered problems and/or other inefficiencies with current implementations of performing data-driven determinations based on a data set, particularly unstructured data set(s), Through applied effort, ingenuity, and innovation, Applicant has solved many of these identified problems by developing solutions embodied in the present disclosure, which are described in detail below.

BRIEF SUMMARY

In one aspect, a computer-implemented method for performing at least one focused data-based determination from an unstructured data set is provided. The example computer-implemented method includes receiving the unstructured data set, extracting an identified relevant subset of the unstructured data set by processing the unstructured data set utilizing at least one high-level extractor model, extracting low-level relevant data from the identified relevant subset of the unstructured data set by processing the identified relevant subset utilizing at least one low-level extractor model, generating fraud probability data by applying at least the low-level relevant data and the identified relevant subset to a fraud processing model, and outputting at least the fraud probability data.

In one aspect, a computer-implemented method includes training, by one or more processors, a first model based on a first data set, where the first data set is associated with a first model domain, integrating, by one or more processors, the first model into a second model, training, by one or more processors, the second model based on the first data set, freezing, by one or more processors, the first model integrated into the second model, training, by one or more processors, a remaining portion of the second model based on a second data set, where the second data set is associated with a second model domain.

In one aspect, a computer-implemented method includes extracting an initial keyword set from an identified relevant subset of an unstructured data set, where the identified relevant subset is generated based on at least one high-level extractor model, where the initial keyword set is extracted based on a keyword extraction model that generates a keyword relevance score for each keyword of the initial keyword set, identifying at least one irrelevant keyword based on a keyword relevance threshold and the keyword relevance score for each keyword of the initial keyword set, generating an updated keyword set by at least removing the at least one irrelevant keyword from the initial keyword set, removing, from the updated keyword set, at least one unknown keyword, generating a filtered keyword set by applying a dictionary filter model to the updated keyword set, and outputting at least one keyword from the filtered keyword set.

In another aspect of the disclosure, a computing apparatus is provided. One example computing apparatus includes a processor and a memory having computer-coded instructions stored thereon that, in execution with the processor, causes the apparatus to perform any one of the example computer-implemented methods described herein.

In another aspect of the disclosure, a computer program product is provided. One example computer program product comprises a non-transitory computer-readable storage medium, the non-transitory computer-readable storage medium including instructions that, when executed by a computing apparatus, cause the computing apparatus to perform any one of the example computer-implemented processes described herein.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
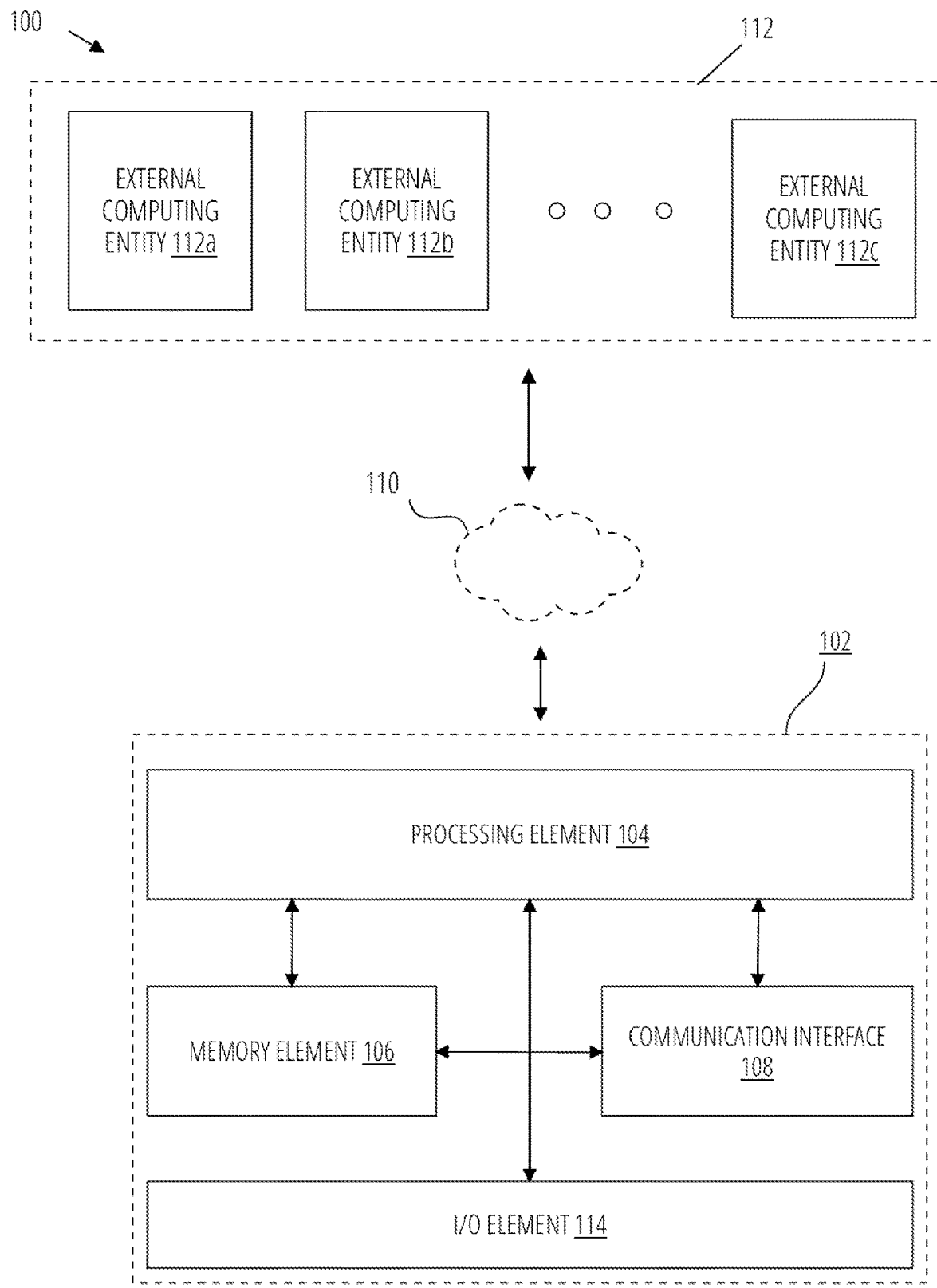
FIG. 1 illustrates an example computing system 100 in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout.

Embodiments of the present disclosure can be implemented in various ways, including as computer program products that comprise articles of manufacture. Such computer program products can include one or more software components including, for example, software objects, methods, data structures, or the like. A software component can be coded in any of a variety of programming languages. An illustrative programming language can be a lower-level programming language such as an assembly language associated with a particular hardware architecture and/or operating system platform. A software component comprising assembly language instructions can require conversion into executable machine code by an assembler prior to execution by the hardware architecture and/or platform. Another example programming language can be a higher-level programming language that can be portable across multiple architectures. A software component comprising higher-level programming language instructions can require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages can be executed directly by an operating system or other software component without having to be first transformed into another form. A software component can be stored as a file or other data storage construct. Software components of a similar type or functionally related can be stored together such as, for example, in a particular directory, folder, or library. Software components can be static (e.g., pre-established, or fixed) or dynamic (e.g., created or modified at the time of execution).

A computer program product can include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium can include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium can also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium can also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium can also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium can include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media can be substituted for or used in addition to the computer-readable storage media described above.

As should be appreciated, various embodiments of the present disclosure can also be implemented as methods, apparatus, systems, computing devices, computing entities, and/or the like. As such, embodiments of the present disclosure can take the form of an apparatus, system, computing device, computing entity, and/or the like executing instructions stored on a non-transitory computer-readable storage medium to perform certain steps or operations. Thus, embodiments of the present disclosure can also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations can be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a non-transitory computer-readable storage medium for execution. For example, retrieval, loading, and execution of code can be performed sequentially such that one instruction is retrieved, loaded, and executed at a time. In some exemplary embodiments, retrieval, loading, and/or execution can be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps Technical Problems and Technical Solutions In various contexts, one or more data portion(s) is processed for use in a particular data-driven determination. In one such example context, data is processed for purposes of determining a prediction indicating whether a medical claim should be approved or denied as fraudulent. Such processing may utilize a particular model to process such data, for example, an electronic medical record.

In many of such contexts, processing of various data portion(s) is particularly inefficient, cumbersome, or otherwise impractical to accomplish accurately. Often, for example, only some of the data portion(s) inputted for processing is relevant to the data-driven determination being performed. For example, in the context of electronic medical record processing for purposes of fraud prediction, the data portion(s) may include lab report(s), lab order(s), healthcare provider report(s), healthcare facility report(s), cover sheet(s) associated with such records, and/or the like, where only certain pages of the medical report include data relevant to the fraud prediction to be performed. However, the data portion(s) inputted for processing also are embodied by one or more data set(s), object(s), and/or the like in a manner that is unstructured (e.g., unordered or otherwise not arranged in a predetermined manner), such that it is unknown whether a particular portion of data is relevant for processing or irrelevant for processing. In this regard, the one or more data portion(s) require significant interaction with each data portion individually to process that data portion, determine if it is relevant, and ultimately actually process the data portion or ignore the data portion.

Embodiments of the present disclosure provide for improved focusing of data portions. In this regard, the improved focused data portions may be more efficiently processed, or otherwise processed in a less cumbersome manner, for example to perform at least one focused data-based determination. Such embodiments in some embodiments reduce the amount of computing resources required to process an unstructured data set by identifying which data portions are particularly relevant to a particular data-driven determination, and limiting processing to only the relevant portions of the unstructured data set. By avoiding processing the irrelevant portions of the unstructured data set, such embodiments advantageously conserve processing resources (e.g., processing power, memory, storage, networking resources, and/or the like) and conserve execution time that would otherwise be required to process such irrelevant data portions with minimal or no impact to the result of the data-driven determination. Additionally or alternatively, some embodiments advantageously specially configure at least one user interface to improve ease of interaction with relevant data portions of an unstructured data set, for example without requiring that the user individually determine the relevant data portions of the unstructured data set. For example, some embodiments advantageously configure a user interface such that relevant data portions, or particular data elements (e.g., text, images, and/or the like) therein, are prioritized, indicated, and/or otherwise presented for efficient access by the user. Additionally or alternatively, for example, some embodiments advantageously configure a user interface such that relevant data portions, or particular data elements (e.g., text, images, and/or the like) therein, are visually distinguished as relevant to a particular data-driven determination to improve identification of such data by the user interacting with or otherwise viewing the user interface.

Embodiments utilize one or more specially configured subsystems that process an unstructured data set to extract particular relevant data portion(s) from the unstructured data set and/or derive particular data from relevant data portion(s) of the unstructured data set. Some embodiments process an unstructured data set utilizing at least one high-level extractor model that identifies an identified relevant subset of the unstructured data set, for example including each portion of the unstructured data set determined relevant. The relevant data portions embodied in the identified relevant subset are further processable by a fraud processing model, renderable to a user interface, and/or processable for further determination of page rating data and/or keyword data associated with the relevant data portion.

Additionally or alternatively, some embodiments process the relevant data portions of the initial keyword set utilizing at least one low-level extractor model that identifies low-level relevant data within such data portion(s). The low-level data may embody particular data values corresponding to relevant parameter(s) to be extracted from the unstructured data set. The low-level relevant data is further processable by a fraud processing model, renderable to a user interface, and/or processable for one or more further determination, for example of page rating data and/or keyword data associated with the relevant data portion.

Additionally or alternatively, some embodiments generate page rating data associated with relevant data portion(s) of the unstructured data set. The page rating data represents a relevancy of a particular relevant data portion of the unstructured data set. The page rating data is further processable by a fraud processing model, renderable to a user interface, and/or processable for further determination of relevant text and/or keyword data associated with the relevant data portion.

Additionally or alternatively, some embodiments identifies relevant text from the relevant data portion(s) of the unstructured data set. The relevant text is further processable in one or more determination(s), renderable to a user interface, and/or the like.

Additionally or alternatively, some embodiments identify relevant keyword(s) from relevant data portion(s). The keyword(s) may provide explainability into the operation or functioning of a model, such as the fraud processing model. The keyword(s) are further processable in one or more determination(s), renderable to a user interface, and/or the like.

Some embodiments utilize a fraud processing model to generate fraud probability data based on relevant portion(s) of the unstructured data set. The fraud probability data may represent a likelihood or other predicted determination of fraud for a particular medical claim, for example. The fraud probability data is further processable in one or more determination(s), renderable to a user interface, and/or the like.

Some embodiments utilize any or all of the identified, extracted, and/or derived data to generate a focused user interface. For example, the user interface in some embodiments is focused in a manner that enables a user to access the relevant data portion(s) quickly and/or with limited user interaction required to separate the relevant data portion(s) from irrelevant data portion(s). Additionally or alternatively, some embodiments render the user interface including supporting data that is utilized by a user to efficiently analyze the relevant portion(s) of an unstructured data set, for example relevant text, page rating data, keyword(s) generated associated with the relevant data portion(s), results generated from high-level extractor model(s) and/or low-level extractor model(s), fraud probability data, and/or the like. In this regard, whereas existing user interfaces are unfocused and require human users to manually parse through the entirety of the unstructured data set, such embodiments advantageously provide a streamlined interface that is focused on particular data relevant to the user for processing such data of the unstructured data set during performance of a particular data-driven determination.

In this regard, embodiments of the present disclosure provide various technical improvements in the field of machine learning (e.g., by specially processing an input data set for processing by a machine learning model to generate a result with improved accuracy over processing the unprocessed input data set, and/or by improving accuracy of such machine learning implementations generally). Additionally or alternatively, embodiments of the present disclosure provide various technical improvements in the field of input data processing (e.g., by transforming an unstructured data set with no identifiable distinctions between data portions to a focused set of data portions determined to have relevance to a particular data-driven task or other consideration). Additionally or alternatively, embodiments of the present disclosure provide various technical improvements in the field of user interface generation (e.g., by providing an interface that visually emphasizes or otherwise targets particular portions of a data set that were not identifiable for focusing before the processing as depicted and described, and/or by providing a specially-focused or otherwise streamlined providing streamlined access to particular portion(s) of the data set that are determined may be relevant for user inspection).

Definitions

"Candidate classification" may refer to a selectable classification for a particular portion of data. "Candidate classifications" and "a set of candidate classifications" includes any number of candidate classifications from which a selection may be made.

"Central truth source" may refer to an electronically managed file, data repository, set of data object(s), and/or other stored data that is determined or otherwise indicated to include trusted data for a particular process.

"Classification" may refer to a defined category of data. In one example context, a classification is a defined category of a page of a medical record.

"Code" may refer to data representing or associated with a medical code associated with a medical treatment, diagnosis, cost, reimbursement, associated disease, associated drug, and/or other medical data.

"Dictionary filter model" may refer to at least one algorithmic, statistical, and/or machine learning model that generates a filtered keyword set by filtering one or more keyword(s) from a set of keywords utilizing data from a central truth source.

"Filtered keyword set" may refer to one or more data objects including one or more keyword(s) of a set of keywords that remain after filtering via a dictionary filter model.

"Focused data" may refer to a portion of data indicated as relevant to a particular process by at least one computer-executed determination.

"Focused data-based determination" may refer to a data-driven determination or data value derived from a particular portion of an unstructured data set that is determined relevant to a particular determination.

"Fraud probability data" may refer to data indicative of a prediction of whether particular data is indicative of fraudulent behavior. In one example context, the fraud probability data includes percentage or proportional data indicative of fraud along a spectrum and a binary determination of fraudulent or not fraudulent of data.

"Fraud processing model" may refer to at least one algorithmic, statistical, and/or machine learning model that is specially configured to generate fraud probability data based on one or more input(s).

"High-level extractor model" may refer to at least one algorithmic, statistical, and/or machine learning model that identifies an identified relevant subset from an unstructured data set.

"Image processing model" may refer to at least one algorithmic, statistical, and/or machine learning model that is specially configured to identify and/or extract data from at least one input image by processing the at least one input image.

"Initial keyword set" may refer to one or more data structure(s) including any number of keyword(s) generated utilizing at least one keyword extraction model.

"Identified relevant subset" may refer to at least one data object including or embodying one or more data portion(s) of an unstructured data set that are identified as relevant for a particular process.

"Irrelevant keyword" may refer to a keyword determined to be associated with a keyword relevance score that does not satisfy a corresponding keyword relevance threshold.

"Keyword" may refer to a particular string of computer-detectable text that is under consideration as being relevant for explainability of a particular model-driven determination, or is determined as being relevant for explainability of a particular model-driven determination.

"Keyword extraction model" may refer to at least one algorithmic, statistical, and/or machine-learning model that generates a set of keywords associated with explainability of a particular model. Non-limiting examples of a keyword extraction model include an attention algorithm, an attention-based machine-learning model, a LIME model, and a SHAP model.

"Keyword relevance score" may refer to electronically managed data representing impact of a particular keyword on operation of a model or a data-driven determination.

"Keyword relevance threshold" may refer to a data value representing a cutoff that distinguishes a keyword that is relevant from a keyword that is relevant. In one example context a keyword relevance threshold represents a data value that, below which, a keyword is determinable an irrelevant keyword, and above which the keyword is determinable as a relevant keyword.

"Low-level extractor model" may refer to an algorithmic, statistical, and/or machine learning model that identifies low-level relevant data from a particular data set including one or more portion(s) of data.

"Low-level relevant data" may refer to at least one data object including or embodying one or more data value(s) corresponding to one or more data parameter(s), where the data value(s) is/are extracted from one or more data portion(s) of an unstructured data set.

"Model domain" may refer to a particular goal for which a model is trainable based on particular features represented in a data set, where the particular features correspond to particular features that may have at least some impact on the outcome of the model domain.

"Page rating data" may refer to electronically managed data that indicates a relevance or impact of a particular portion of an unstructured data set towards a particular data-driven determination.

"Page relevancy model" may refer to at least one algorithmic, statistical, and/or machine learning model that generates page rating data corresponding to a particular portion of an unstructured data set.

"Relevant text" may refer to a portion of text data extracted from at least a portion of an unstructured data set that is determined to be relevant towards a particular data-driven determination.

"Renderable page" may refer to electronically managed data embodying a sub-portion of an unstructured data set that includes text, image, or other data that is capable of being rendered to a display of at least one device. Non-limiting examples of a renderable page include a page of an electronic document, a page of a PDF, and a portion of a webpage.

"Selected classification" may refer to a particular classification from a set of candidate classifications selected in response to a user input or a data-driven determination.

"Text processing model" may refer to at least one algorithmic, statistical, and/or machine learning model that is specially configured to extract particular text from at least one input document including text or other input text data by processing the inputted text.

"Trusted description data" may refer to electronically managed data corresponding to a particular code that translates the code to a particular machine-readable and/or human-readable description of the code. The trusted description data for a particular code is determinable from at least one central truth source.

"Unknown keyword" may refer to a keyword that is determined to not exist within a particular data corpus.

"Unstructured data set" may refer to a data set embodied by one or more data structure(s) that include a plurality of data portions, where any number of the data portions may be relevant to a particular process, and where any such data portions relevant to a particular process are not initially distinguishable within the data set from other data portions of the data set that are irrelevant to the particular process. In one example context, an unstructured data set includes a medical record of multiple pages, which may be arranged in any order.

"Updated keyword set" may refer to one or more data structure(s) including any number of keyword(s) generated by altering an existing set of one or more keyword(s).

"Visually distinguished" may refer to any mechanism of rendering particular data of a data set to a user interface that distinguishes the particular data from remaining data of the data set. Non-limiting examples of visually distinguished data includes a user interface within which particular data is emphasized, enlarged, highlighted, and/or rendered with any other visual effect.

Example Framework

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more prediction techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more data objects from and/or to the external computing entities 112a-c to perform one or more steps/operations of one or more prediction techniques described herein.

The external computing entities 112a-c, for example, may include and/or be associated with one or more end user devices, data centers, and/or the like that utilize results generated as part of processing an unstructured data set to generate and/or process focused data associated therewith. The end user devices, for example, may be user-operated devices that enable user engagement with one or more user interfaces, submission of data for storing via one or more data repositories and/or for processing, and/or the like. The data centers, for example, may be associated with one or more data repositories storing data that may, in some circumstances, be processed by the predictive computing entity 102, such as at least one data portion of an unstructured data set corresponding to a particular entity, medical claim, and/or the like. By way of example, the external computing entities 112a-c may be associated with a plurality of entities. A first example external computing entity 112a, for example, may host a registry for the entities. By way of example, in some example embodiments, the entities may include one or more service providers and the external computing entity 112a may host a registry (e.g., the national provider identifier registry, and/or the like) including one or more medical record(s) for patients that have engaged with the service providers. In addition, or alternatively, a second example external computing entity 112b may include one or more claim processing entities that may receive, store, and/or have access to a historical interaction dataset for the entities, claims submission data, and/or the like for a particular patient. In some embodiments, a third example external computing entity 112c may include a host of UMLS or other central truth source data. Additionally or alternatively, in some embodiments, a fourth example computing entity includes other user device(s) that provide at least a portion of data embodying a data portion of an unstructured data set associated with a particular entity.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interface 108 for communicating with various computing entities such as the external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
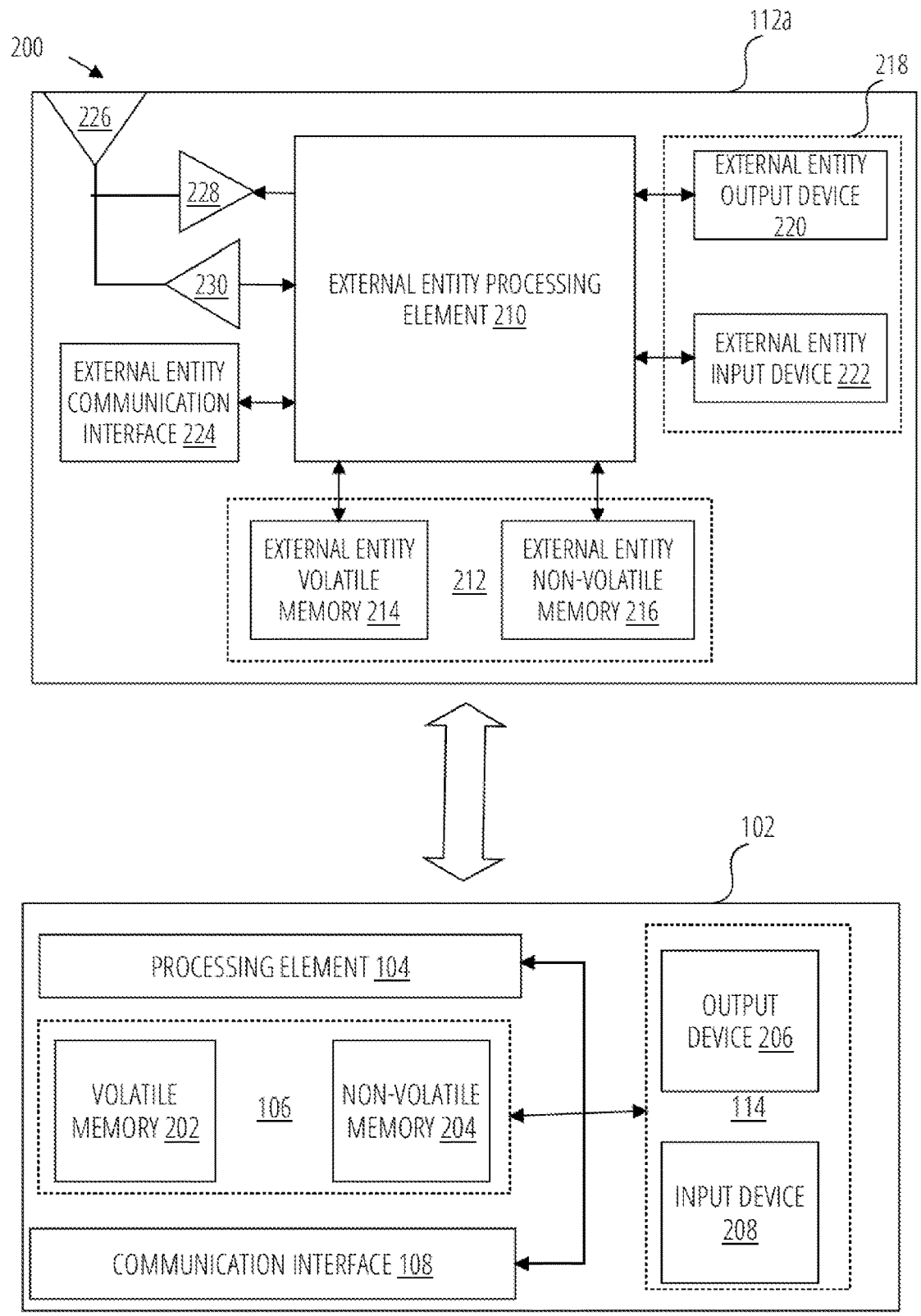
FIG. 2 is a schematic diagram showing a system computing architecture 200 in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry such as a communication bus, and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Implementations of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as in a particular directory, folder, or library. Software components may be static (e.g., pre-established, or fixed) or dynamic (e.g., created, or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TDSCDMA), Long Term Evolution (LTE), Evolved Universal Terrestrial Radio Access Network (E-UTRAN), Evolution-Data Optimized (EVDO), High Speed Packet Access (HSPA), HighSpeed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry such as a communication bus, and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

Example Systems and Apparatuses of the Disclosure

Figure 3:
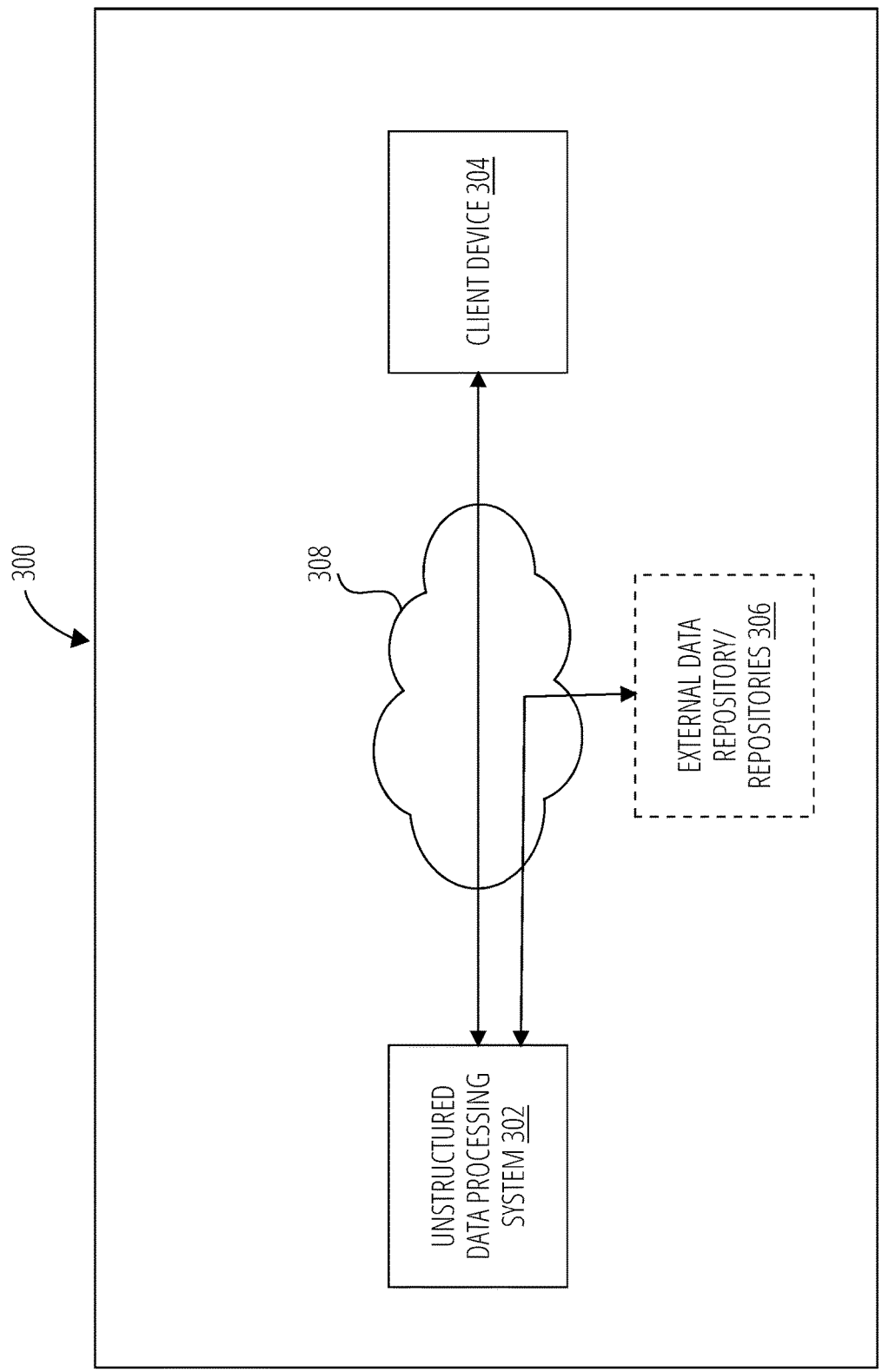
FIG. 3 illustrates a system diagram of an example system in accordance with at least one example embodiment of the present disclosure.

FIG. 3 illustrates a system diagram of an example system in accordance with at least one example embodiment of the present disclosure. Specifically, FIG. 3 illustrates an example framework 300. The example framework 300 includes at least unstructured data processing system 302, client device 304, and external data repository/repositories 306. In some embodiments, the framework 300 includes a communications network 308 that enables transmission of data between one or more of the subsystem(s) and/or device(s) of the framework 300. For example, in some embodiments the communications network 308 facilitates communication between the unstructured data processing system 302 and one or more of the client device 304 and/or external data repository/repositories 306. Additionally or alternatively, in some embodiments, the communications network 308 or another communications network (not depicted) facilitates communication between the client device 304 and/or external data repository/repositories 306.

The unstructured data processing system 302 includes one or more computer(s) embodied in hardware, software, firmware, and/or a combination thereof. In some embodiments, the unstructured data processing system 302 includes one or more application server(s), database server(s), enterprise computing terminal(s), cloud computer(s), and/or the like. In some embodiments, the unstructured data processing system 302 includes one or more backend system(s) that are communicable over one or more network(s), such as a LAN, enterprise intranet, and/or via the Internet, to access functionality associated with processing an unstructured data set for one or more focused data-based determination, In some embodiments, the unstructured data processing system 302 includes or is electronically communicable with a display that enables outputting of particular user interface(s) to a user associated with the unstructured data processing system 302. In other embodiments, the unstructured data processing system 302 includes only back end components, for example that provide and/or display outputs via communication with a corresponding client device as described herein.

In some embodiments, the unstructured data processing system 302 includes one or more computer(s) that support processing of an unstructured data set for focused data-based determination(s). For example, in some embodiments, the unstructured data processing system 302 supports focusing of an unstructured data set by identifying particular relevant portions of an unstructured data set, and generating specially configured user interface(s) that includes particular, focused data portions of the unstructured data set for manual review. Additionally or alternatively, in some embodiments, the unstructured data processing system 302 supports focusing of an unstructured data set by identifying particular relevant portions of an unstructured data set, and automatically processing the focused data portions to automatically perform a focused data-based determination. In some embodiments, the unstructured data processing system 302 performs focusing of the unstructured data set utilizing high-level extractor model(s), low-level extractor model(s), page rating data associated with portion(s) of the unstructured data set, relevant text extracted from relevant portions of the unstructured data set, and/or keyword(s) generated and identified from within relevant portion(s) of the unstructured data set, and/or any combination thereof. In some embodiments, the unstructured data processing system 302 supports using a specially trained model (e.g., a fraud processing model) for generating predicted data associated with a focused data-based determination (e.g., fraud probability data) based on relevant data identified from the unstructured data set, for example utilizing one or more of the high-level extractor model(s), low-level extractor model(s), page rating data associated with portion(s) of the unstructured data set, relevant text extracted from relevant portions of the unstructured data set, and/or keyword(s) generated and identified from within relevant portion(s) of the unstructured data set, and/or any combination thereof. Additionally or alternatively, in some embodiments, the unstructured data processing system 302 supports training of a model utilizing particular improved techniques by leveraging other model(s) and training data for other model domain(s) to improve the performance of the model for a particular data-driven determination.

The client device 304 includes one or more computer(s) embodied in hardware, software, firmware, and/or a combination thereof. In some embodiments, the client device 304 includes one or more user device(s) or other front-end device(s) that enable communication and/or interaction with the functionality of the unstructured data processing system 302. In some embodiments, the client device 304 includes a smartphone, a tablet, a personal computer, a laptop, a smart device, an enterprise terminal or employee terminal, and/or the like. In some embodiments, the client device 304 includes hardware, software, firmware, and/or a combination thereof, that embodies a user-facing application that enables initiation and/or access to the functionality of the unstructured data processing system 302 and/or user interfaces generated based on the data received from and/or otherwise produced associated with the functionality of the unstructured data processing system 302. Alternatively, in some embodiments, the client device 304 embodies a subsystem of the unstructured data processing system 302, for example where the client device 304 includes or is embodied by a display and/or connected peripheral device(s) of the unstructured data processing system 302.

In some embodiments, the framework 300 optionally includes one or more external data repository/repositories 306. The external data repository/repositories 306 includes one or more computer(s) embodied in hardware, software, firmware, and/or a combination thereof. In some embodiments, the external data repository/repositories 306 includes one or more application server(s), database server(s), enterprise computing terminal(s), cloud computer(s), and/or the like. Additionally or alternatively, in some embodiments, the external data repository/repositories 306 includes one or more specially configured non-transitory computer-readable media, memory/memories, and/or the like, that are specially configured to store particular data. In some embodiments, the external data repository/repositories 306 includes one or more computer(s) communicable with the unstructured data processing system 302 directly without use of any external network, one or more computer(s) communicable with the unstructured data processing system 302 via an intranet or LAN, and/or one or more cloud repositories remote from the unstructured data processing system 302, and/or any combination thereof.

In some embodiments, the external data repository/repositories 306 includes one or more computer(s) that store at least a portion of data that is aggregable, processable, and/or otherwise part of an unstructured data set. In some embodiments, the external data repository/repositories 306 includes multiple disparate data sources that include data linked to a shared entity, identifier, and/or the like. In this regard, the unstructured data processing system 302 may communicate with each of such external data repository/repositories 306 to identify, retrieve, and/or otherwise generate some or all of an unstructured data set corresponding to the particular entity, identifier, and/or the like. For example, in some embodiments, the external data repository/repositories 306 includes one or more electronic medical record repositories for patients, and the unstructured data processing system 302 retrieves and/or aggregates one or more portion(s) of electronic medical records corresponding to a particular patient to generate an unstructured data set corresponding to the patient for processing. Additionally or alternatively, in some embodiments, the unstructured data processing system 302 maintains one or more data repositories local to or otherwise directly accessible to the unstructured data processing system 302 from which at least a portion of an unstructured data set is created.

The communications network 308 is configurable to be embodied in any of a myriad of network configurations. In some embodiments, the communications network 308 embodies a public network (e.g., the Internet). In some embodiments, the communications network 308 embodies or includes, in whole or in part, a private network (e.g., an internal, localized, or otherwise closed-off network between particular devices). In some other embodiments, the communications network 308 embodies a hybrid network (e.g., a network enabling internal communication between particular connected devices to the network and external communication with other devices to some or all of the networked devices). In some embodiments, the communications network 308 includes one or more base station(s), relay(s), switch(es), cell tower(s), communication cable(s), associated routing station(s), and/or the like. In some embodiments, the communications network 308 includes one or more computing device(s) controlled by individual entities (e.g., an entity-owned router such as a home router), and/or modem controlled by an enterprise (e.g., an enterprise switch at a work location). Additionally or alternatively, in some embodiments, the communications network 308 includes one or more external utility device(e) (e.g., Internet service provider communication station(s), and/or other device(s)).

The communications network 308 in some embodiments operates utilizing one or more particular network communication protocol(s). For example, in some embodiments, the communications network 308 is accessible at least in part utilizing Wi-Fi, Bluetooth, NFC, ZigBee, and/or the like. It should be appreciated that in some embodiments, the communications network 308 includes one or more sub-network(s) that includes one or more different device(s), utilizes different protocol(s), and/or the like. For example, in some embodiments, the unstructured data processing system 302 and the client device 304 communicate at least in part utilizing a different network than the network utilized to communicate between the unstructured data processing system 302 and the external data repository/repositories 306.

The computing devices of the framework 300 may each communicate in whole or in part over a portion of one or more communication network(s), such as the communications network 308. For example, each of the components of the framework 300 may be communicatively coupled to transmit data to and/or receive data from one another over the same and/or different wireless or wired networks embodying the communications network 308. Non-limiting examples of network configuration(s) for the communications network 308 include, without limitation, a wired or wireless Personal Area Network (PAN), Local Area Network (LAN), Metropolitan Area Network (MAN), Wide Area Network (WAN), and/or the like. Additionally, while FIG. 3 illustrate certain system entities as separate, standalone entities communicating over the communications network(s), the various embodiments are not limited to this particular architecture. In other embodiments, one or more computing entities share one or more components, hardware, and/or the like, or otherwise are embodied by a single computing device such that connection(s) between the computing entities are altered and/or rendered unnecessary. Alternatively or additionally still, in some embodiments the communications network 308 enables communication to one or more other computing device(s) not depicted, for example client device(s) for accessing functionality of any of the subsystems therein via native and/or web-based application(s), and/or the like.

Figure 4:
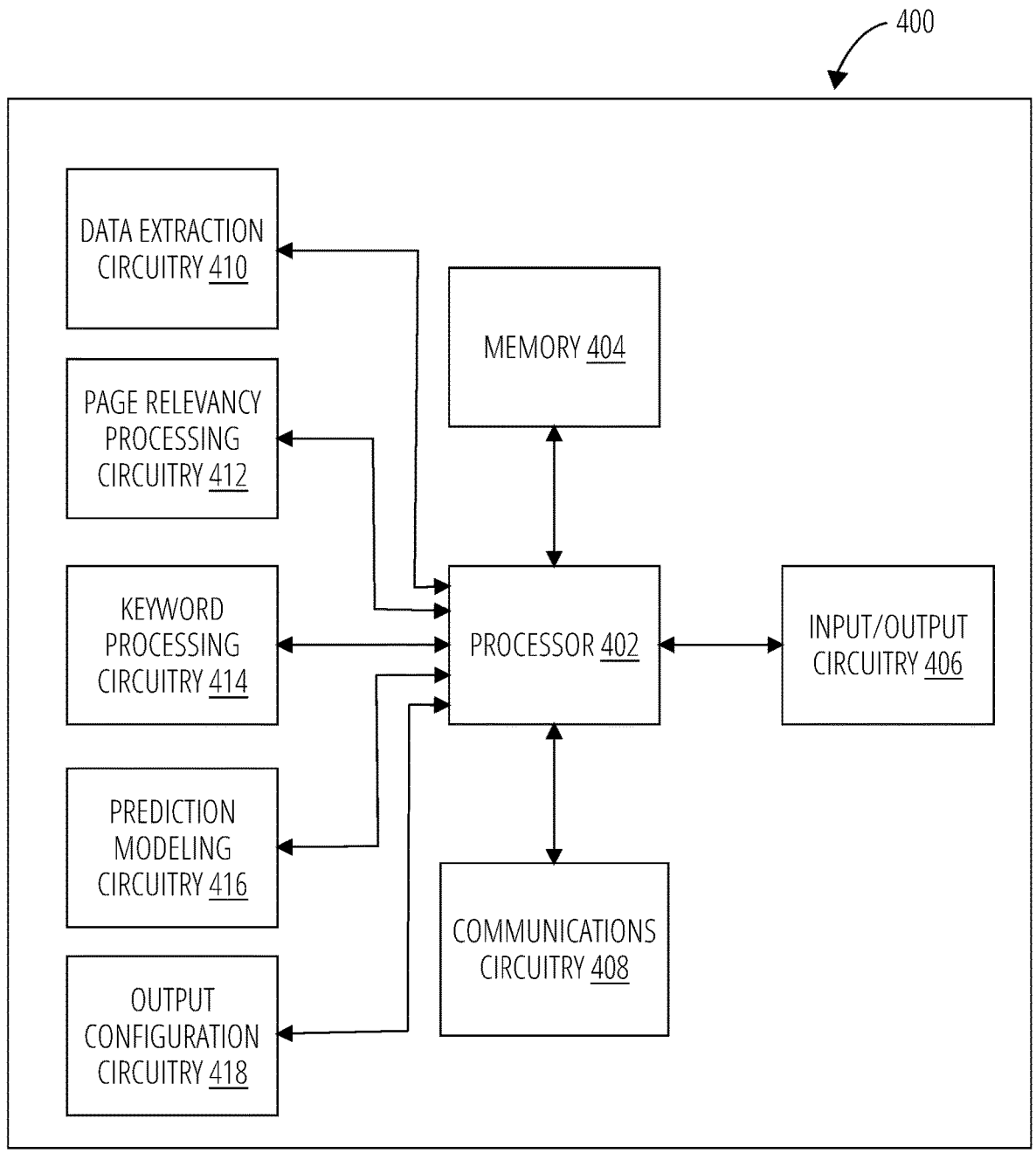
FIG. 4 illustrates a block diagram of an example apparatus that may be specially configured in accordance with at least one example embodiment of the present disclosure.

FIG. 4 illustrates a block diagram of an example apparatus that may be specially configured in accordance with at least some example embodiments of the present disclosure. Specifically, FIG. 4 illustrates an example data focusing apparatus 400 ("apparatus 400") specifically configured in accordance with at least one example embodiment of the present disclosure. In some embodiments, the unstructured data processing system 302, and/or a portion thereof, is embodied by one or more system(s), device(s), and/or the like, such as the apparatus 400 as depicted and described in FIG. 4. The apparatus 400 includes processor 402, memory 404, input/output circuitry 406, communications circuitry 408, data extraction circuitry 410, page relevancy processing circuitry 412, keyword processing circuitry 414, prediction modeling circuitry 416, and/or output configuration circuitry 418. In some embodiments, the apparatus 400 is configured, using one or more of the sets of circuitry including processor 402, memory 404, input/output circuitry 406, communications circuitry 408, data extraction circuitry 410, page relevancy processing circuitry 412, keyword processing circuitry 414, prediction modeling circuitry 416, and/or output configuration circuitry 418, to execute and perform one or more of the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 400 embodies a particular, specially configured computing entity transformed to enable the specific operations described herein and provide the specific advantages associated therewith, as described herein.

Although components of the apparatus 400 are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 400 provide or supplement the functionality of another particular set of circuitry. For example, the processor 402 in some embodiments provides processing functionality to any of the sets of circuitry, the memory 404 provides storage functionality to any of the sets of circuitry, the communications circuitry 408 provides network interface functionality to any of the sets of circuitry, and/or the like.

In some embodiments, the processor 402 (and/or co-processor or any other processing circuitry assisting or otherwise associated with the processor) is/are in communication with the memory 404 via a bus for passing information among components of the apparatus 400. In some embodiments, for example, the memory 404 is non-transitory and may include, for example, one or more volatile and/or non-volatile memories. In other words, for example, the memory 404 in some embodiments includes or embodies an electronic storage device (e.g., a computer readable storage medium). In some embodiments, the memory 404 is configured to store information, data, content, applications, instructions, or the like, for enabling the apparatus 400 to carry out various functions in accordance with example embodiments of the present disclosure.

The processor 402 may be embodied in a number of different ways. For example, in some example embodiments, the processor 402 includes one or more processing devices configured to perform independently. Additionally or alternatively, in some embodiments, the processor 402 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 400, and/or one or more remote or "cloud" processor(s) external to the apparatus 400.

In an example embodiment, the processor 402 is configured to execute instructions stored in the memory 404 or otherwise accessible to the processor. Alternatively or additionally, the processor 402 in some embodiments is configured to execute hard-coded functionality. As such, whether configured by hardware or software methods, or by a combination thereof, the processor 402 represents an entity (e.g., physically embodied in circuitry) capable of performing operations according to an embodiment of the present disclosure while configured accordingly. Alternatively or additionally, as another example in some example embodiments, when the processor 402 is embodied as an executor of software instructions, the instructions specifically configure the processor 402 to perform the algorithms embodied in the specific operations described herein when such instructions are executed. In some embodiments, the processor 402 includes or is embodied by a CPU, microprocessor, and/or the like that executes computer-coded instructions, for example stored via the non-transitory memory 404.

In some example embodiments, the processor 402 is configured to perform various operations associated with improved training of a model for performing focused data-based determination(s), and/or processing an unstructured data set for performing a focused data-based determination. In some embodiments, the processor 402 includes hardware, software, firmware, and/or a combination thereof, that specially trains a machine learning model for improved operation by integrating at least one sub-model and freezing training of the sub-model for one or more stages of training. Additionally or alternatively, in some embodiments, the processor 402 includes hardware, software, firmware, and/or a combination thereof, that identifies relevant data portions of an unstructured data set, and/or relevant data therein, utilizing at least one high-level extractor model and/or low-level extractor model. Additionally or alternatively, in some embodiments, the processor 402 includes hardware, software, firmware, and/or a combination thereof, that generates page rating data associated with one or more data portion of an unstructured data set. Additionally or alternatively, in some embodiments, the processor 402 includes hardware, software, firmware, and/or a combination thereof, that identifies relevant text from at least one data portion of an unstructured data set. Additionally or alternatively, in some embodiments, the processor 402 includes hardware, software, firmware, and/or a combination thereof, that processes a relevant subset of the unstructured data set, low-level relevant data identified therein, page rating data, relevant text, and/or any combination thereof, utilizing a model (e.g., a fraud processing model) specially configured to perform a focused data-based determination based on such inputted data. Additionally or alternatively, in some embodiments, the processor 402 includes hardware, software, firmware, and/or a combination thereof, that generates keyword(s) associated with operation of the specially configured model. Additionally or alternatively, in some embodiments, the processor 402 includes hardware, software, firmware, and/or a combination thereof, that outputs any of the data to a specially configured user interface rendered to a display of the apparatus 400 or an external device, and/or outputs any of the data to another system or subsystem for further processing.

In some embodiments, the apparatus 400 includes input/output circuitry 406 that provides output to the user and, in some embodiments, to receive an indication of a user input. In some embodiments, the input/output circuitry 406 is in communication with the processor 402 to provide such functionality. The input/output circuitry 406 may comprise one or more user interface(s) and in some embodiments includes a display that comprises the interface(s) rendered as a web user interface, an application user interface, a user device, a backend system, or the like. In some embodiments, the input/output circuitry 406 also includes a keyboard, a mouse, a joystick, a touch screen, touch areas, soft keys a microphone, a speaker, or other input/output mechanisms. The processor 402 and/or input/output circuitry 406 comprising the processor may be configured to control one or more functions of one or more user interface elements through computer program instructions (e.g., software and/or firmware) stored on a memory accessible to the processor (e.g., memory 404 and/or the like). In some embodiments, the input/output circuitry 406 includes or utilizes a user-facing application to provide input/output functionality to a client device and/or other display associated with a user. In some embodiments, the input/output circuitry 406 includes hardware, software, firmware, and/or a combination thereof, that facilitates simultaneously display of particular data via a plurality of different devices.

In some embodiments, the apparatus 400 includes communications circuitry 408. The communications circuitry 408 includes any means such as a device or circuitry embodied in either hardware or a combination of hardware and software that is configured to receive and/or transmit data from/to a network and/or any other device, circuitry, or module in communication with the apparatus 400. In this regard, in some embodiments the communications circuitry 408 includes, for example, a network interface for enabling communications with a wired or wireless communications network. Additionally or alternatively in some embodiments, the communications circuitry 408 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 408 includes circuitry for interacting with the antenna(s) and/or other hardware or software to cause transmission of signals via the antenna(s) or to handle receipt of signals received via the antenna(s). In some embodiments, the communications circuitry 408 enables transmission to and/or receipt of data from a client device, local data repository or subsystem, external data system, and/or other external computing device in communication with the apparatus 400.

In some embodiments, the apparatus 400 includes data extraction circuitry 410. The data extraction circuitry 410 supports functionality associated with extracting a focused portion of relevant data from an unstructured data set. For example, in some embodiments, the data extraction circuitry 410 includes hardware, software, firmware, and/or a combination thereof, that processes an unstructured data set utilizing at least one high-level extractor model that identifies relevant data portion(s) of the unstructured data set. Additionally or alternatively, in some embodiments, the data extraction circuitry 410 includes hardware, software, firmware, and/or a combination thereof, that processes at least one portion (e.g., relevant data portions) of an unstructured data set utilizing at least one low-level extractor model that identifies low-level relevant data from within such data portion(s). Additionally or alternatively, in some embodiments, the data extraction circuitry 410 includes hardware, software, firmware, and/or a combination thereof, that stores data identified or extracted utilizing the high-level extractor model, and/or the low-level extractor model, for subsequent use. In some embodiments, the data extraction circuitry 410 includes a separate processor, specially configured field programmable gate array (FPGA), or a specially programmed application specific integrated circuit (ASIC).

In some embodiments, the apparatus 400 includes page relevancy processing circuitry 412. The page relevancy processing circuitry 412 supports functionality associated with generating and/or identifying relevancy of data portion(s) of the unstructured data set and/or data therein. For example, in some embodiments, the page relevancy processing circuitry 412 includes hardware, software, firmware, and/or a combination thereof, that generates page rating data corresponding to a particular data portion of an unstructured data set. Additionally or alternatively, in some embodiments, the page relevancy processing circuitry 412 includes hardware, software, firmware, and/or a combination thereof, that identifies and/or extracts relevant text from a particular data portion of an unstructured data set. Additionally or alternatively, in some embodiments, the page relevancy processing circuitry 412 includes hardware, software, firmware, and/or a combination thereof, that processes data portion(s) of an unstructured data set included in an identified relevant subset generated utilizing at least one high-level extractor model. In some embodiments, the page relevancy processing circuitry 412 includes a separate processor, specially configured field programmable gate array (FPGA), or a specially programmed application specific integrated circuit (ASIC).

In some embodiments, the apparatus 400 includes keyword processing circuitry 414. The keyword processing circuitry 414 supports functionality associated with generating keyword(s) providing explainability of a particular model, such as a fraud processing model. For example, in some embodiments, the keyword processing circuitry 414 includes hardware, software, firmware, and/or a combination thereof, that generates an initial keyword set including at least one keyword for consideration. Additionally or alternatively, in some embodiments, the keyword processing circuitry 414 includes hardware, software, firmware, and/or a combination thereof, that removes irrelevant keyword(s) from consideration. Additionally or alternatively, in some embodiments, the keyword processing circuitry 414 includes hardware, software, firmware, and/or a combination thereof, that removes unknown keywords from consideration. Additionally or alternatively, in some embodiments, the keyword processing circuitry 414 includes hardware, software, firmware, and/or a combination thereof, that generates a filtered keyword set from keywords being considered based on a central truth source. Additionally or alternatively, in some embodiments, the keyword processing circuitry 414 includes hardware, software, firmware, and/or a combination thereof, that processes and/or outputs at least one remaining keyword in the filtered keyword set. In some embodiments, the keyword processing circuitry 414 includes a separate processor, specially configured field programmable gate array (FPGA), or a specially programmed application specific integrated circuit (ASIC).

In some embodiments, the apparatus 400 includes prediction modeling circuitry 416. The prediction modeling circuitry 416 supports functionality associated with processing input data utilizing at least one specially configured model. For example, in some embodiments, the prediction modeling circuitry 416 trains a specially configured model for performing a focused data-based determination utilizing at least one sub-model and a plurality of data sets from different model domains. Additionally or alternatively, in some embodiments, the prediction modeling circuitry 416 includes hardware, software, firmware, and/or a combination thereof, that trains the specially configured model by freezing and unfreezing at least a portion of the model at different stages of training. Additionally or alternatively, in some embodiments, the prediction modeling circuitry 416 includes hardware, software, firmware, and/or a combination thereof, that applies one or more portions of input data to a specially trained model to generate corresponding output data. For example, in some embodiments, the prediction modeling circuitry 416 applies an identified relevant subset, low-level relevant data, page rating data, and/or relevant data, or a combination thereof, to a specially configured fraud processing model to generate fraud probability data, where the fraud probability data corresponds to a particular focused data-based determination. In some embodiments, the prediction modeling circuitry 416 includes a separate processor, specially configured field programmable gate array (FPGA), or a specially programmed application specific integrated circuit (ASIC).

In some embodiments, the apparatus 400 includes output configuration circuitry 418. The output configuration circuitry 418 supports functionality associated with outputting data via a specially configured user interface, and/or outputting data for further processing and/or storing, associated with performance of a focused data-based determination. For example, in some embodiments, the output configuration circuitry 418 includes hardware, software, firmware, and/or a combination thereof, that specially configures a user interface to include at least one interface element configured based on relevant data portion(s) identified for an unstructured data set (e.g., an identified relevant subset of the unstructured data set). Additionally or alternatively, in some embodiments, the output configuration circuitry 418 includes hardware, software, firmware, and/or a combination thereof, that specially configures a user interface to include at least one interface element configured based on low-level relevant data associated with at least one data portion of an unstructured data set. Additionally or alternatively, in some embodiments, the output configuration circuitry 418 includes hardware, software, firmware, and/or a combination thereof, that specially configures a user interface to include at least one interface element configured based on page rating data associated with at least one data portion of an unstructured data set. Additionally or alternatively, in some embodiments, the output configuration circuitry 418 includes hardware, software, firmware, and/or a combination thereof, that specially configures a user interface to include at least one interface element configured based on at least one keyword determined as explainable for at least one model. Additionally or alternatively, in some embodiments, the output configuration circuitry 418 includes hardware, software, firmware, and/or a combination thereof, that specially configures a user interface to include at least one interface element configured based on output data generated from a specially configured model based on particular input data applied to the model (e.g., fraud probability data generated via a specially configured fraud processing model). In some embodiments, the output configuration circuitry 418 includes a separate processor, specially configured field programmable gate array (FPGA), or a specially programmed application specific integrated circuit (ASIC).

Additionally or alternatively, in some embodiments, two or more of the sets of circuitries embodied by processor 402, memory 404, input/output circuitry 406, communications circuitry 408, data extraction circuitry 410, page relevancy processing circuitry 412, keyword processing circuitry 414, prediction modeling circuitry 416, and/or output configuration circuitry 418, are combinable. Alternatively or additionally, in some embodiments, one or more of the sets of circuitry perform some or all of the functionality described associated with another component. For example, in some embodiments, two or more of the processor 402, memory 404, input/output circuitry 406, communications circuitry 408, data extraction circuitry 410, page relevancy processing circuitry 412, keyword processing circuitry 414, prediction modeling circuitry 416, and/or output configuration circuitry 418, are combined into a single module embodied in hardware, software, firmware, and/or a combination thereof. Similarly, in some embodiments, one or more of the sets of circuitry, for example, the data extraction circuitry 410, page relevancy processing circuitry 412, keyword processing circuitry 414, prediction modeling circuitry 416, and/or output configuration circuitry 418, is/are combined with the processor 402, such that the processor 402 performs one or more of the operations described above with respect to each of the processor 402, memory 404, input/output circuitry 406, communications circuitry 408, data extraction circuitry 410, page relevancy processing circuitry 412, keyword processing circuitry 414, prediction modeling circuitry 416, and/or output configuration circuitry 418.

Example Data Flows of the Disclosure

Having described example systems and apparatuses in accordance with the present disclosure, example data flows of the disclosure will now be discussed. In some embodiments, one or more computing system(s) maintain the various subcomponents that perform the data flow as depicted as described. For example, in some embodiments, the apparatus 400 maintains a software environment including the various subcomponents and/or data utilized by such subcomponents in accordance with the example data flow(s) as depicted and/or described.

Figure 5:
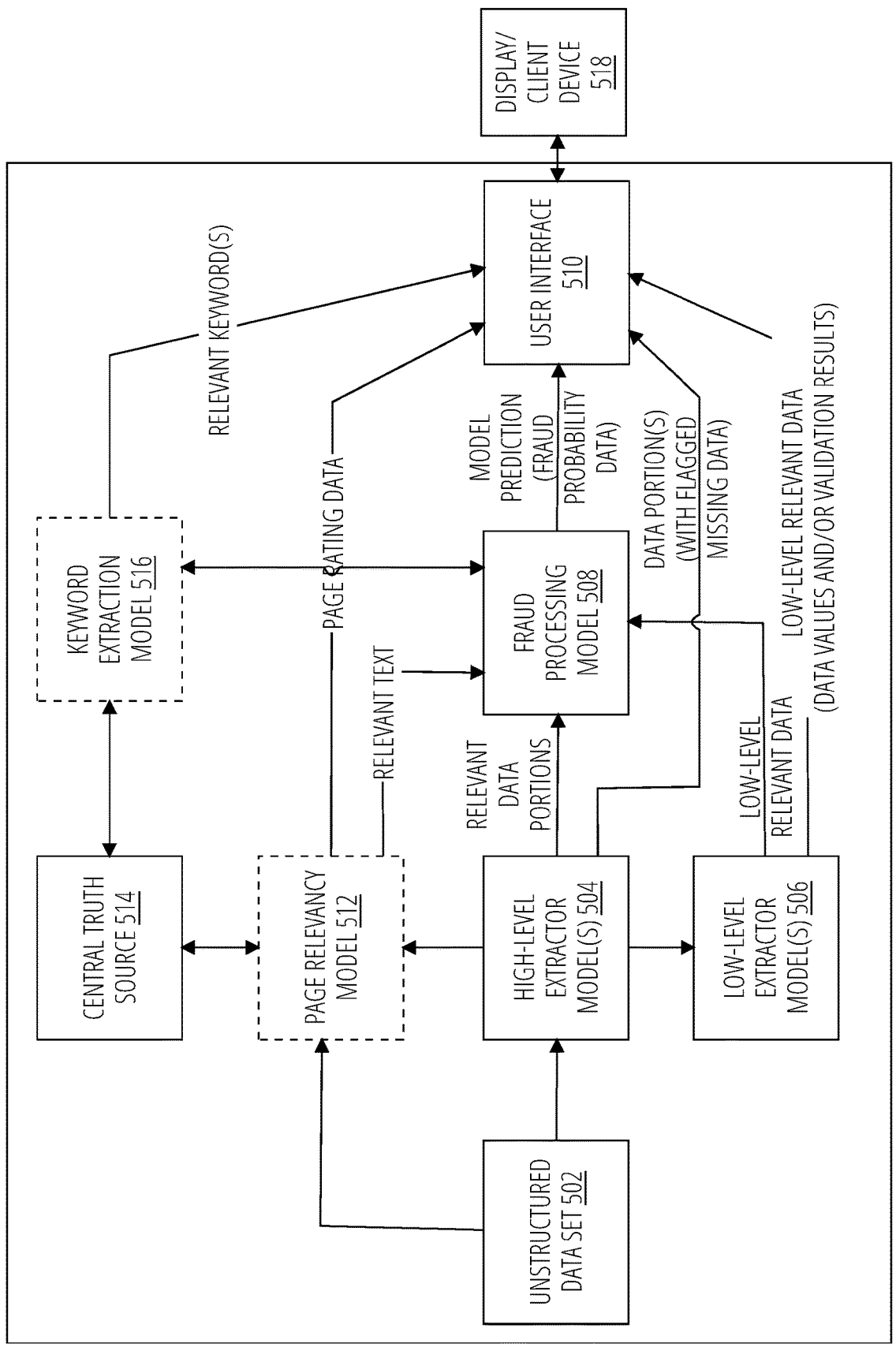
FIG. 5 illustrates a data flow diagram between subcomponents of at least one example embodiment of the present disclosure.

FIG. 5 illustrates a data flow diagram between subcomponents of at least one example embodiment of the present disclosure. Specifically, FIG. 5 illustrates a data flow diagram for processing an unstructured data set associated with a focused data-based determination. In some embodiments, each subcomponent depicted with respect to FIG. 5 is maintained by a specially configured system, for example the unstructured data processing system 302 embodied by the apparatus 400, in at least one computing environment (e.g., a software environment executed utilizing particular hardware and/or firmware). In this regard, the apparatus 400 may generate and/or communicate the depicted and described data portions between the various subcomponents in the computing environment as depicted and described herein.

As illustrated, the apparatus 400 begins by receives the unstructured data set 502. The unstructured data set 502 may include any number of individual data portions, for example, a number of pages (e.g., each embodied by a PDF file, text file, image file, or portion thereof) processable by the apparatus 400. In one example context, the unstructured data set 502 embodies a medical record, or set of medical records, associated with a particular patient, where the medical record(s) includes any number of lab reports, lab orders, claim reports, and/or other medical data associated with medical event(s) performed by one or many different healthcare provider(s). In some embodiments, the apparatus 400 receives the unstructured data set 502 by retrieving the data from one or more data repositories, receiving the unstructured data set 502 from one or more external system(s), in response to user input, and/or the like.

The unstructured data set 502 is provided to one or more high-level extractor model(s) 504. In some embodiments, the high-level extractor model(s) 504 includes one or more machine learning, statistical, and/or algorithmic model(s) that determine relevant data portion(s) from the unstructured data set 502. In some embodiments, the unstructured data set 502 generates and/or otherwise identifies an identified relevant subset of the unstructured data set 502 by processing one or more portion(s) of the unstructured data set 502. In some embodiments, the high-level extractor model(s) 504 classify each data portion of the unstructured data set 502, such that the relevant portion(s) may be determinable based on the classification associated with each data portion. The high-level extractor model(s) 504 may output the relevant data portions (e.g., embodied in an identified relevant subset) to one or more of the low-level extractor model(s) 506, fraud processing model 508, and/or page relevancy model 512 for processing by such sub-components. In some embodiments, one or more of the high-level extractor model(s) 504 explicitly determine which data portion(s) of an unstructured data set represent relevant classification(s). Additionally or alternatively, in some embodiments, one or more of the high-level extractor model(s) 504 explicitly determine which data portion(s) of an unstructured data set represent irrelevant classification(s). In this regard, in such embodiments, embodiments of the present disclosure may further process any of a number of data portion(s) not determined to be relevant or irrelevant by the high-level extractor(s) utilizing one or more other process(es), as further described herein.

Additionally or alternatively, in some embodiments, the high-level extractor model(s) 504 outputs the relevant data portions to a user interface 510 for rendering. In some embodiments, the high-level extractor model(s) 504 identifies and/or outputs flagged missing elements expected from the unstructured data set 502. In some embodiments, the high-level extractor model(s) 504 determines which data portions are expected based on a medical claim code identified in the unstructured data set 502 and/or otherwise being processed (e.g., as part of a fraud determination).

The low-level extractor model(s) 506 receives the relevant data portions (e.g., embodied in an identified relevant subset) from the high-level extractor model(s) 504. In some embodiments, the low-level extractor model(s) 506 includes one or more machine learning, statistical, and/or algorithmic model(s) that extracts particular data values corresponding to relevant data parameters in relevant portions of the unstructured data set 502, and/or perform one or more data validation(s) based on the data values. In some embodiments, the low-level extractor model(s) 506 generates low-level relevant data indicating the data values of such relevant data parameters, and/or validation results associated with such data values. The low-level extractor model(s) 506 in some embodiments outputs the low-level relevant data to fraud processing model 508 for further processing. Additionally or alternatively, in some embodiments, the low-level extractor model(s) 506 outputs the low-level relevant data to the user interface 510 for rendering. In some embodiments, the low-level relevant data is rendered including tagged data values in circumstances where a validation result indicates a mismatch between data value(s) and corresponding expected data value(s), and/or missing data values, from within the unstructured data set 502.

The fraud processing model 508 receives various input data for processing. In some embodiments, the fraud processing model 508 receives input data including at least relevant data portions from the high-level extractor model(s) 504 (e.g., an identified relevant subset) and/or low-level relevant data from the low-level extractor model(s) 506. Additionally or alternatively in some embodiments the fraud processing model 508 receives input data including relevant text from the page relevancy model 512.

The fraud processing model 508 in some embodiments includes one or more machine learning, statistical, and/or algorithmic model(s) that generate data embodying a particular prediction based on the received input data. For example, in some embodiments, the fraud processing model 508 processes the input data to generate fraud probability data, where the fraud probability data indicates a likelihood that a medical claim, or portion thereof, should b e denied as fraudulent based on the unstructured data set 502. In some embodiments, the fraud processing model 508 is specially trained in a particular manner that enables improved accuracy of the generated output data associated with a particular focused data-based determination. Non-limiting examples of such improved training are depicted and described herein with respect to FIG. 12.

In some embodiments, the fraud processing model 508 processes any one or combination of input data to produce output data corresponding to a particular focused data-driven determination. For example, in some embodiments, the fraud processing model 508 is configured to receive the unstructured data set 502 and/or particular data thereof (e.g., text represented in the unstructured data set 502) as the sole input for processing. Additionally or alternatively, in some embodiments, the fraud processing model 508 receives as input relevant text from the unstructured data set 502, for example as identified utilizing the page relevancy model 512, high-level extractor model(s) 504, and/or the like, which may be received as a sole input or together with the unstructured data set 502 generally. Additionally or alternatively still, in some embodiments, the fraud processing model 508 receives as input the output of the page relevancy model 512, the output of the high-level extractor model(s) 504, or the output of the low-level extractor model(s) 506, and/or any combination thereof, to perform such processing. It will be appreciated that the fraud processing model 508 may be specially configured in different embodies to account for a particular set or combination of input data types, as depicted and/or described herein, and generate corresponding output data based at least in part on such input data types.

In some embodiments, the fraud processing model 508 may output the generated output data to one or more other system(s) for further processing. Additionally or alternatively, in some embodiments, the fraud processing model 508 outputs the generated output data (e.g., fraud probability data) to the user interface 510 for rendering.

In some embodiments, the relevant data portions and/or unstructured data set 502 itself is/are provided to the optional page relevancy model 512. In some embodiments, the page relevancy model 512 includes one or more machine learning, statistical, and/or algorithmic model(s) that generate and/or determine relevant text from a data portion of the unstructured data set 502 and/or page rating data associated with a data portion of the unstructured data set 502. In some embodiments, the page relevancy model 512 processes only relevant data portions of the unstructured data set 502, for example, embodied in an identified relevant subset provided by the high-level extractor model(s) 504. In some embodiments, the page rating data associated with a particular data portion indicates the relevancy of the data portion to a particular focused data-based determination, for example, a particular data-driven determination associated with processing a medical claim (e.g., indicating whether the claim is likely fraudulent). Additionally or alternatively, the relevant text in some embodiments includes the particular data values or other data within a particular data portion that is relevant to a focused data-based determination. In some embodiments, the page relevancy model 512 performs based on a central truth source 514. In some embodiments, the central truth source 514 includes data from a trusted source, system, or user input that indicates standardized or otherwise trusted text or similar data for use in processing a data portion for page relevancy and/or keyword explainability, as discussed further below. In some embodiments, the page relevancy model 512 identifies relevant data portion(s) in addition to and/or based at least in part on output(s) from the high-level extractor(s) 504. For example, in some embodiments, the page relevancy model 512 may determine particular relevant data portion(s) based at least in part on a classification corresponding to each data portion, such that particular data portion(s) determined corresponding to particular classifications are indicated or otherwise determined to be relevant without subsequent processing by the page relevancy model 512. Additionally or alternatively, in some embodiments, the page relevancy model 512 performs one or more additional process(es) for determining relevant data portion(s) in addition to those identified based at least in part on the high-level extractor(s) 504 alone. Non-limiting examples of a page relevancy model are depicted and described herein with respect to FIG. 13.

In some embodiments, the page relevancy model 512 outputs the relevant text to a fraud processing model 508 for processing. Additionally or alternatively, in some embodiments, the page relevancy model 512 outputs page rating data for one or more data portion to the user interface 510 for rendering.

In some embodiments, the keyword extraction model 516 generates and/or otherwise identifies one or more relevant keyword(s) associated with the operation of the fraud processing model 508. The keyword(s) in some embodiments represent particular feature(s) or other explainable element(s) that highlight particular data parameters identified from the unstructured data set 502 that are associated with operation of the fraud processing model 508. In some embodiments, the keyword extraction model 516 generates or otherwise identifies the relevant keyword(s) based on the central truth source 514, for example, by identifying keyword(s) included in the unstructured data set 502 that are determined similar to corresponding trusted description data based on the central truth source 514. Additionally or alternatively, in some embodiments, the keyword extraction model 516 outputs relevant keyword(s) for one or more data portion to the user interface 510 for rendering. For example, in some embodiments, the user interface 510 renders the relevant keyword(s) in a manner that enables the user to jump to particular data values within the relevant data portions of the unstructured data set 502.

In some embodiments, the user interface 510 is configured by the apparatus 400 for rendering to one or more display. For example, in some embodiments the user interface 510 is rendered to display/client device 518. The display/client device 518 in some embodiments includes or is embodied by a display of the apparatus 400. In some other embodiments, the display/client device 518 includes or is embodied by a device separate from the apparatus 400, for example an end user device associated with a particular user. In some embodiments, the apparatus 400 causes rendering of the user interface 510 via transmission of data utilized to configure one or more interface element in the user interface 510, for example by transmitting such data from the apparatus 400 to the display/client device 518. In this regard, a user associated with the display/client device 518 may view the user interface 510 and interact with one or more interface element(s) therein to view particular data and/or otherwise efficiently perform a focused data-based determination based on such data (e.g., quickly and/or with minimal user engagement with the user interface to reach a desired portion of the user interface).

Example User Interfaces of the Disclosure

Having described example systems, apparatuses, and data flows in accordance with the present disclosure, example user interfaces of the disclosure will now be discussed. In some embodiments, the example user interface(s) is/are renderable to a display of a particular computing system, for example, embodied by the apparatus 400. Additionally or alternatively, in some embodiments, the apparatus 400 causes rendering of the example user interface(s) to an external computing system, for example a client device communicable with the apparatus 400. For example, in some embodiments, the apparatus 400 causes rendering of the example user interface(s) via transmission of one or more networking message(s) that embody or include data utilized to render the user interface.

Figure 6:
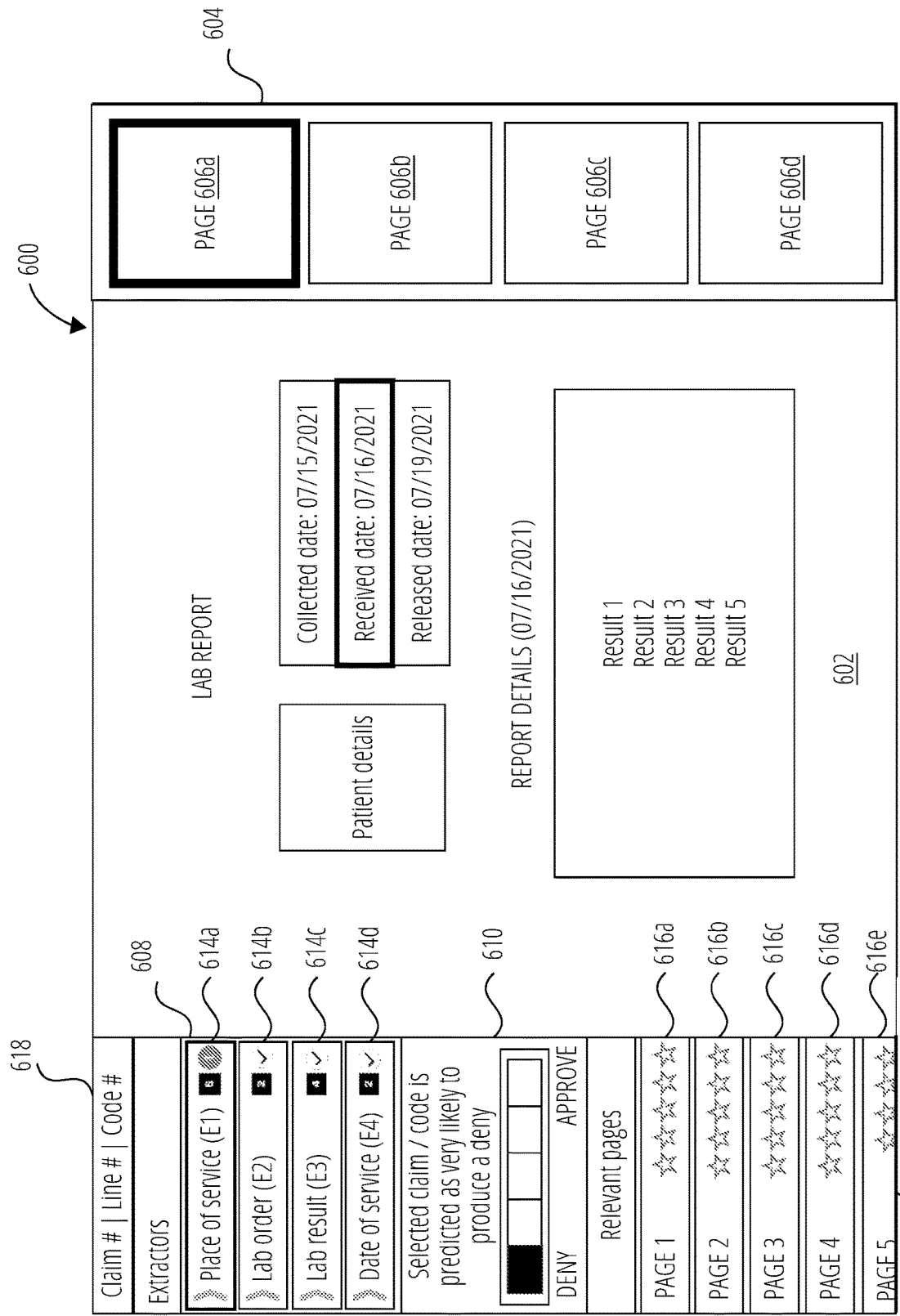
FIG. 6 illustrates an example user interface in accordance with at least one example embodiment of the present disclosure.

FIG. 6 illustrates an example user interface in accordance with at least one example embodiment of the present disclosure. Specifically, FIG. 6 depicts an example user interface 600. The user interface 600 is specially focused on particular data to enable performance of a focused data-based determination. For example, as illustrated, the user interface 600 includes interface elements focused for performance of a fraud determination of a medical claim based on processing an unstructured data set. Specifically, the user interface 600 includes particular interface elements configured based on focused data embodying relevant portions of the unstructured data set and/or data therein or derived therefrom. In some embodiments, the apparatus 400 configures and/or causes rendering of the user interface based on one or more portions of outputted data, for example, any of the outputted data as depicted and described with respect to FIG. 5 and/or FIGS. 5-12 as depicted and described herein.

The user interface 600 includes a claim selection control 618. In some embodiments, the claim selection control 618 indicates a selected medical claim, medical claim line, and/or medical claim code selected for processing via the user interface 600. In some embodiments, the claim selection control 618 is configured to enable selection of a particular medical claim, medical claim line, and/or medical claim code via user engagement with the claim selection control 618. Additionally or alternatively, in some embodiments, the apparatus 400 provides a set of candidate medical claims, medical claim lines, and/or medical claim codes selectable via the claim selection control 618, such that a user may select from such data via user engagement with the claim selection control 618. In some embodiments, the apparatus 400 configures the user interface 600 to be focused with particular data identified based on the selected code, and/or in other embodiments the selected medical claim and/or claim line.

The user interface 600 includes a content portions viewer 604. In some embodiments, the content portions viewer 604 includes an interface element associated with each data portion of an unstructured data set. In some embodiments, each interface enables access to the corresponding data portion by rendering at least part of the data portion to the selected content view 602, as described further herein. Additionally or alternatively, in some embodiments, the content portions viewer 604 includes an interface element corresponding to each data portion of n unstructured data set indicated relevant by at least one high-level extractor model.

As illustrated, the content portions viewer 604 includes interface elements associated with a plurality of pages 606a-606d. The first user interface element for page 606a may correspond to a first page of the unstructured data set, or relevant portions thereof (e.g., represented by an identified relevant subset for example). The second user interface element for page 606b may correspond to a second page of the unstructured data set, or relevant portions thereof, and so on. In some embodiments, for example, the user engages with the page 606a to cause rendering of at least a portion of the second page to the selected content view 602. In this regard, in some embodiments a user associated with the user interface 600 may provide user engagement (e.g., a click, tap, gesture, peripheral input, key press, and/or the like) to cause rendering of a particular portion of a data portion of an unstructured data set to the selected content view 602. In some embodiments, the content portions viewer 604 is focused by rendering interface elements only associated with particular relevant data portions of the unstructured data set, for example, data portions (e.g., one or more pages) embodied in an identified relevant subset of the unstructured data set generated or otherwise determined utilizing at least one high-level extractor model.

The user interface 600 includes a selected content view 602. In some embodiments, the selected content view 602 includes a renderable page representation of at least a portion of a selected data portion of a data set. In some embodiments, the selected content view 602 includes a viewport depicting at least a portion of a PDF renderable page selected by the user (e.g., via user engagement with at least one interface element of the content portions viewer 604, for example 606a-606d). In some embodiments, a user may engage the selected content view 602 to view, magnify, and/or otherwise engage with the data portion rendered to the selected content view 602. In some embodiments, the selected content view 602 includes a larger version of the data portion selected via one of the interface elements for pages 606a-606d.

In some embodiments, one or more portions of data depicted in the selected content view 602 may be visually distinguished or otherwise adjusted from the file or other source where the renderable page is retrieved. For example, in some embodiments, the apparatus 400 causes rendering of the user interface 600 with particular data representing low-level relevant data visually distinguished. In some such embodiments, data value(s) may be visually distinguished to indicate particular data value(s) that are determined to contribute to a likelihood of fraud or otherwise determined not to match expected values. For example, in some embodiments, data values embodying low-level relevant data is/are visually distinguished based on validation results performed utilizing such data values. Additionally or alternatively, in some embodiments, the apparatus 400 visually distinguishes one or more data value(s) corresponding to particular identified keyword(s) associated with explainability of a model utilized for a focused data-based determination. In some embodiments, such data values are visually distinguished based on data determined by the apparatus 400, for example, associated with the keyword(s) and/or model such as a fraud processing model, that indicates whether the data value contributed to an increased likelihood of fraud or a decreased likelihood of fraud.

The user interface 600 further includes an extractor view 608. In some embodiments, the extractor view 608 includes user interface elements corresponding to some or all of the high-level extractor model(s) and/or low-level extractor model(s) utilized to process the unstructured data set. For example as illustrated, the extractor view 608 includes extractor selection element 614a-614d, each associated with a different high-level extractor model or low-level extractor model. The extractor selection element 614a, for example, corresponds to a low-level extractor model that identifies low-level relevant data embodying a place of service, whereas extractor selection element 614b corresponds to a high-level extractor model that identifies data portions of an unstructured data set embodying a lab order. It will be appreciated that any number of high-level extractor models and/or low-level extractor models may be associated with interface elements in the extractor view 608.

In some embodiments, a user may provide user engagement with one of the extractor selection element(s) of the extractor view 608 to quickly navigate to a particular portion of the unstructured data set. For example, in some embodiments, a user may engage the extractor selection element 614a to see the places of service identified as low-level relevant data in the unstructured data set by at least one low-level extractor model, Additionally or alternatively, a user may engage the extractor selection element 614a to jump to the particular data portion(s) of the unstructured data set including such low-level relevant data (e.g., by causing rendering of a data portion selected via engagement with the extractor selection element 614a to the selected content view 602 for viewing by a user in response to such engagement). Additionally or alternatively, in some embodiments, a user may engage the extractor selection element 614b to see the data portions determined associated with a classification of "Lab Order" by at least one high-level extractor model. Additionally or alternatively, a user may engage the extractor selection element 614b to jump to the particular data portion(s) of the unstructured data set classified as a "Lab Order" classification 9 e.g., by causing rendering of a data portion selected via engagement with the extractor selection element 614b to the selected content view 602 in response to such engagement). In this regard, the interface elements of the extractor view 608 may enable a user to quickly navigate between data portions that include specific data value(s) that the user desires to view, and/or between data portions associated with particular classifications that the user desires to review.

In some embodiments, the user interface 600 further includes one or more interface element(s) representing data outputted by a specially configured model and associated with a focused data-based determination. For example, as illustrated, the user interface 600 includes prediction indicator 610. The prediction indicator 610 includes a visual representation of fraud probability data determined via the apparatus 400 by a specially configured fraud processing model. For example, in some embodiments the apparatus 400 generates fraud probability data based on an identified relevant subset, low-level relevant data, page rating data, relevant text, and/or other relevant data extracted from the unstructured data set that is applied as input data to a fraud processing model. As illustrated, the prediction indicator 610 includes a visual slider having multiple portions, where one of the portions is filled or illuminated to indicate whether the fraud probability data indicates more likely to deny a medical claim (or particular claim line or code thereof) as likely fraudulent or approve the medical claim (or claim line or code thereof) as likely not fraudulent. The specific portion illuminated may be based on the value of the generated fraud probability data (e.g., left-most portion close to deny if value indicates 0-20%, second-left if value indicates 21-40%, and so on for each quintile). In other embodiments, the prediction indicator 610 includes a different graphical, textual, or other visual representation of the fraud probability data or other model output data. For example, in some embodiments, the user interface 600 includes text representing the fraud probability data as a percentage.

The user interface 600 further includes page rating view 612. The page rating view 612 includes any number of interface elements that depict page rating data corresponding to one or more data portion(s) of the unstructured data set. In some embodiments, the page rating view 612 includes an interface element corresponding to each data portion of the unstructured data set, where the interface element depicts a representation of page rating data corresponding to the data portion. Additionally or alternatively, in some embodiments, the page rating view 612 includes an interface element corresponding to each data portion of an identified relevant subset of the unstructured data set, where the interface element depicts a representation of the page rating data corresponding to the data portion. As illustrated, for example, the page rating view 612 includes page relevancy indicator 616a-616e, which correspond to the first 5 pages of the unstructured data set (e.g., each embodying a relevant data portion of the unstructured data set). As illustrated, each of the page relevancy indicators 616a-616e include a representation of the page rating data as a number of stars, with 5 being the maximal number of stars. In this regard, the user interface 600 may be configured such that a certain number of stars is represented based on the corresponding value of the page rating data associated with the particular data portion corresponding to the interface element. In some embodiments, each page relevancy indicator is configured to enable user engagement that selects the data portion of the unstructured data set corresponding to the interface element. In this regard, in some embodiments, a user may engage the page relevancy indicator to jump to the particular data portion of the unstructured data set corresponding to the indicator (e.g., by causing rendering of the data portion selected via engagement with the interface element to the selected content view 602 in response to such engagement). In this regard, a user may view the page relevancy indicators in the page rating view 612 to efficiently identify particular data portion(s) indicated relevant, and/or quickly navigate between such data portion(s) that the user desires to view.

In some embodiments, the user interface 600 includes a representation of page rating data for a particular data portion in one or more other interface elements additional or alternative to the page rating view 612. For example, in some embodiments, the user interface 600 includes a representation of page rating data as a sub-interface element for each of the interface elements in content portions viewer 604. In some embodiments, the page rating data is utilized by the apparatus 400, for example, to configure a sub-interface element on the interface element corresponding to each page (or other data portion), where the sub-interface element includes a number of stars or other visual, textual, or graphical representation of the page rating data corresponding to the page.

It will be appreciated that in some embodiments, the user interface 600 includes one or more additional and/or alternative control(s) associated with performing a focused data-based determination. For example, in some embodiments, the apparatus 400 causes rendering of the user interface including a first control for denying a medical claim, or portion thereof, and a second control for approving a medical claim, or a portion thereof. In this regard, a user may interact with the user interface 600 to efficiently navigate through an unstructured data set to perform the determination required to accurately approve or deny the medical claim or portion thereof. Additionally or alternatively, in some embodiments, the user interface 600 embodies a sub-interface of a larger user interface.

Example Processes of the Disclosure

Having described example systems and apparatuses, related data flows, and data architectures, in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depicts a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 7:
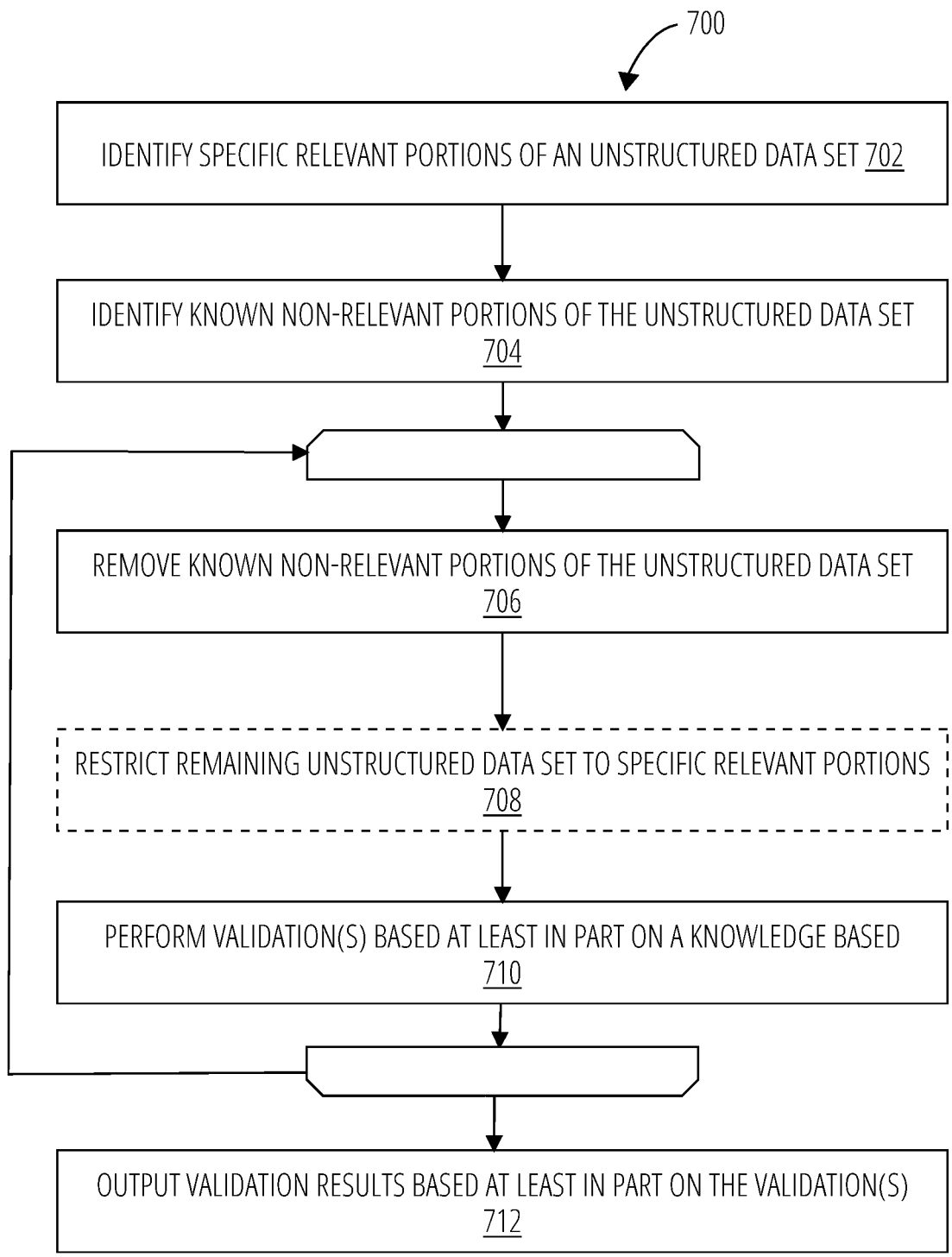
FIG. 7 illustrates a process 700 for performing data validation, for example, embodying or as a sub-process of performing at least one focused data-based determination from an unstructured data set in accordance with at least one example embodiment of the present disclosure.

FIG. 7 illustrates a process for performing data validation. In some embodiments, FIG. 7 depicts a process 700 that may embody an individual process, or embodying a sub-process as part of a process for performing at least one focused data-based determination from an unstructured data set in accordance with at least one example embodiment of the present disclosure. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as the apparatus 400 alone or in communication with one or more other component(s), device(s), system(s), and/or the like. In this regard, in some such embodiments, the apparatus 400 is specially configured by computer-coded instructions (e.g., computer program instructions) stored thereon, for example in the memory 404 and/or another component depicted and/or described herein and/or otherwise accessible to the apparatus 400, for performing the operations as depicted and described. In some embodiments, the apparatus 400 is in communication with one or more external apparatus(es), system(s), device(s), and/or the like, to perform one or more of the operations as depicted and described. For example, the apparatus 400 in some embodiments is in communication with separate component(s) of a network, external network(s), and/or the like, to perform one or more of the operation(s) as depicted and described. For purposes of simplifying the description, the process 700 is described as performed by and from the perspective of the apparatus 400.

In some embodiments, the process 700 begins at operation 702. According to some embodiments, the method includes identifying specific relevant portions of an unstructured data set at operation 702. In some embodiments, the apparatus 400 receives an unstructured data set in whole or in part from an external system, retrieves the unstructured data set from a data repository accessible to the apparatus 400, and/or otherwise identifies the unstructured data set for processing. In some embodiments, the apparatus 400 processes the unstructured data set utilizing one or more specially trained model(s). For example, in some embodiments, the apparatus 400 processes the unstructured data set utilizing at least one high-level extractor model and/or the like. In some such embodiments, the apparatus 400 processes the unstructured data set utilizing one or more specially trained text processing model and/or image processing model that identifies the specific relevant portion(s) of the unstructured data set. For example, in some embodiments, the apparatus 400 processes one or more portion(s) of the unstructured data set, either alone or simultaneously, to classify each portion of the unstructured data set as a particular type of data portion from a set of candidate types, and where a portion of the candidate types in the set of candidate types are indicated as relevant. In the context of electronic medical records for example, the apparatus 400 may classify each portion of an unstructured data set embodying a page of an electronic medical record (e.g., as a cover sheet, lab report, and/or other type of electronic medical record page) and determine that pages classified as certain types (e.g., lab order pages, lab code pages, and/or the like) represent relevant data portion(s) of the unstructured data set.

According to some embodiments, the method includes identifying known non-relevant portions of the unstructured data set using at least one high-level extractor model at operation 704. In some embodiments, the apparatus 400 processes the unstructured data set utilizing one or more specially trained model(s). For example, in some embodiments, the apparatus 400 processes the unstructured data set utilizing at least one high-level extractor model and/or the like, for example as described with respect to operation 702. In some such embodiments, the apparatus 400 processes the unstructured data set utilizing one or more specially trained text processing model and/or image processing model that identifies the specific relevant portion(s) of the unstructured data set. The remaining data portions of the unstructured data set may be determined as known non-relevant portions. Alternatively or additionally, in some embodiments, the model(s) specifically classify portions of the unstructured data set as relevant or non-relevant. Additionally or alternatively, in some embodiments, the apparatus 400 processes one or more portion(s) of the unstructured data set, either alone or simultaneously, to classify each portion of the unstructured data set as a particular type of data portion from a set of candidate types, and where a portion of the candidate types in the set of candidate types are indicated as known and non-relevant. In the context of electronic medical records for example, the apparatus 400 may classify each portion of an unstructured data set embodying a page of an electronic medical record (e.g., as a cover sheet, lab report, and/or other type of electronic medical record page) and determine that pages classified as certain types (e.g., cover sheets, reconsideration forms, administrative forms, and/or the like) represent known non-relevant data portion(s) of the unstructured data set.

In some embodiments, the apparatus 400 utilizes the specific relevant portions of the medical record to identify, extract, and/or validate one or more data value(s) within the relevant portions. For example, the apparatus 400 may process the relevant portions of the unstructured data set utilizing particular model(s). In this regard, the different models may be configured to identify the particular relevant data for processing from the relevant portions of the unstructured data set as depicted and described herein.

According to some embodiments, the method includes removing known non-relevant portions of the unstructured data set at operation 706. In some embodiments, the apparatus 400 deletes the data corresponding to the known non-relevant portions from the unstructured data set. Additionally or alternatively, in some embodiments, the apparatus 400 marks or otherwise flags the know non-relevant portions of the unstructured data set as non-relevant utilizing a data flag, bit flag, or other electronic marker. In this regard, the known non-relevant portions of the unstructured data set may not be processed in accordance with the mark as non-relevant. In some embodiments, the apparatus 400 configures a particular model, for example a low-level extractor model, to ignore or otherwise remove the known non-relevant portions of the unstructured data set for processing.

According to some embodiments, the method includes restricting the unstructured data set to specific relevant portions at operation 708. For example, in some embodiments, the apparatus 400 removes particular relevant portions of the unstructured data set that are predetermined or automatically determined as not relevant to a particular model or data value to be identified. In some such embodiments, for example, certain types of pages or other data portions may be removed from consideration as not including accurate data values corresponding to a particular data parameter, or otherwise likely to include erroneous data values. The particular restricted portions of the unstructured data set may be indicated based on user input, data-driven determination(s), and/or the like.

Additionally or alternatively, in some embodiments, the apparatus 400 restricts a particular relevant page to a particular area within the page. For example, in some embodiments, the apparatus 400 identifies particular areas of a page or other portion of the unstructured data set as relevant for a particular data value to be extracted and/or low-level extractor model. In some embodiments, the apparatus 400 maintains data that defines the relevant area of a particular type of page or other portion of the unstructured data set. Additionally or alternatively, in some embodiments, the apparatus 400 utilizes a model specially trained to identify the area(s) of a particular data portion relevant to processing for a particular data value and/or low-level extractor model. For example, in some embodiments, the relevant area(s) of a particular data portion correspond to predetermined or automatically determined areas of a particular page, or other data portion, where such data is expected or otherwise predicted to be located.

According to some embodiments, the method includes performing validation(s) based on a knowledge base at operation 710. In some embodiments, the apparatus 400 extracts particular data value(s) from the relevant data portion of the unstructured data set, or specifically the relevant areas of a data portion. In some embodiments, the apparatus 400 extracts a data value utilizing a low-level extractor model. For example, in some embodiments, the apparatus 400 is specially trained to extract particular data value(s) corresponding to a particular data parameter. In some embodiments, the apparatus 400 maintains a knowledge base embodying expected data value(s) corresponding to particular data parameter(s). In some embodiments, the apparatus 400 performs a validation by comparing a particular extracted data value from a relevant data portion of the unstructured data set with a corresponding expected data value from the knowledge base.

According to some embodiments, the method includes outputting validation results based on the validation(s) at operation 712. The validation results in some embodiments represents whether the comparison of extracted data matches expected data from the knowledge base, or did not match. In some embodiments, the apparatus 400 outputs the validation results by transmitting the validation results to another subsystem for processing. Additionally or alternatively, in some embodiments, the apparatus 400 outputs the validation results by causing rendering of the validation results to one or more user interface(s). In some embodiments, the apparatus 400 causes rendering of the validation results in a manner that visually distinguishes the extracted data value(s) utilized to generate the validation results. In this regard, in some embodiments, the depicted data value(s) within the data portion(s) may be visually distinguished in a first manner (e.g., highlighted with a first color, for example, green) in a circumstance where the validation results indicate that the corresponding validation was successful. Alternatively, in some embodiments, the depicted data value(s) are not visually distinguished in a circumstance where the validation results indicate that the corresponding validation was successful. Additionally or alternatively, in some embodiments, the depicted data value(s) within the data portion(s) may be visually distinguished in a second manner (e.g., highlighted with a second color, for example, red) in a circumstance where the validation results indicate that the corresponding validation was not successful. Additionally or alternatively, in some embodiments, the apparatus 400 outputs the validation result(s) by rendering the user interface including each validation result (e.g., by rendering the data value indicating whether the validation was successful or not successful).

Figure 8:
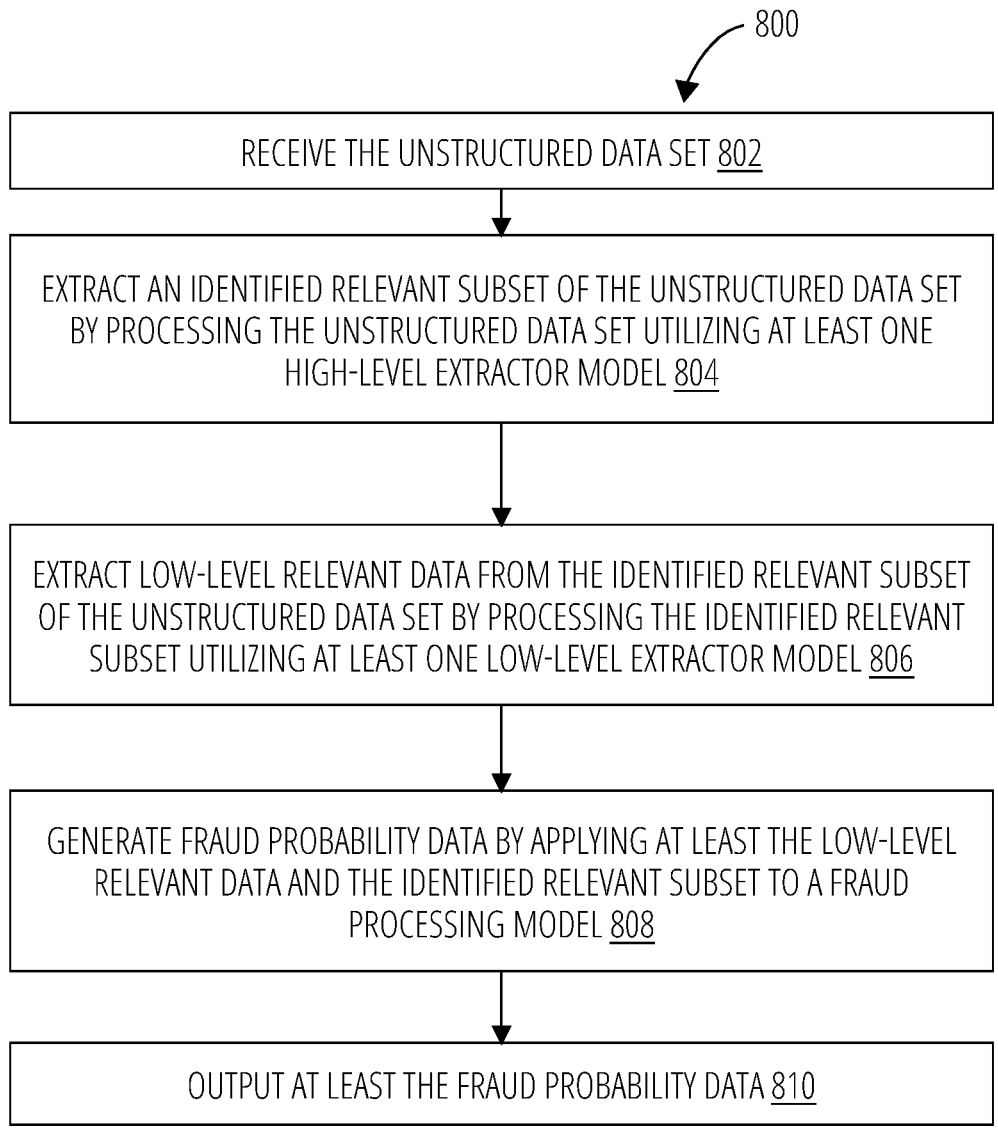
FIG. 8 illustrates a process 800 for generating fraud probability data, for example, embodying or as a sub-process of performing at least one focused data-based determination from an unstructured data set in accordance with at least one example embodiment of the present disclosure.

FIG. 8 illustrates a process for generating fraud probability data. In some embodiments, FIG. 8 depicts a process 800 that may embody an individual process, or a subprocess of performing at least one focused data-based determination from an unstructured data set in accordance with at least one example embodiment of the present disclosure. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the apparatus 400 alone or in communication with one or more other component(s), device(s), system(s), and/or the like. In this regard, in some such embodiments, the apparatus 400 is specially configured by computer-coded instructions (e.g., computer program instructions) stored thereon, for example, in the memory 404 and/or another component depicted and/or described herein and/or otherwise accessible to the apparatus 400, for performing the operations as depicted and described. In some embodiments, the apparatus 400 is in communication with one or more external apparatus(es), system(s), device(s), and/or the like, to perform one or more of the operations as depicted and described. For example, the apparatus 400 in some embodiments is in communication with separate component(s) of a network, external network(s), and/or the like, to perform one or more of the operation(s) as depicted and described. For purposes of simplifying the description, the process 800 is described as performed by and from the perspective of the apparatus 400.

In some embodiments, the process 800 begins at operation 802. In some embodiments, the process 800 is performed as a standalone or independent process together with one or more of the other processes described herein. Additionally or alternatively, in some embodiments, the process 800 begins after one or more operations depicted and/or described with respect to any of the other processes described herein. For example, in some embodiments as depicted, the process 800 at or before execution of operation 712. In this regard, some or all of the process 800 may replace or supplement one or more blocks depicted and/or described with respect to any of the other processes described herein. For example, in some embodiments as depicted, the process 800 supplants, supplements, and/or otherwise replaces an operation of the process 700. Additionally or alternatively, as depicted, upon completion of the process 800, flow may return to one or more operations of another process. For example, as depicted, flow may return to operation 712 as depicted and described.

According to some embodiments, the method includes receiving the unstructured data set at operation 802. In some embodiments, the apparatus 400 receives the unstructured data set transmitted from an external system. For example, in some embodiments the apparatus 400 retrieves at least a portion of the unstructured data set from at least one external data repository communicable with the apparatus 400. Additionally or alternatively, in some embodiments, the apparatus 400 retrieves at least a portion of the unstructured data set from a memory or data repository maintained by the apparatus 400 itself. Additionally or alternatively still, in some embodiments, the apparatus 400 receives the unstructured data set by collecting one or more portion(s) of data over time for one or more entities. For example, in some embodiments, the apparatus 400 and/or an external system collects data as an entity undergoes healthcare events, receives user input associated with such healthcare events, and/or the like.

The data set may be "unstructured" in that particular portions of the data set may not be previously known or immediately identifiable without subsequent processing of the data set. For example, in the context of electronic medical records, the apparatus 400 may receive a data set that includes all electronic medical records corresponding to a particular patient or other entity. The data set may include different types of pages (e.g., lab reports, lab codes, cover pages, claim sheets, and/or the like), which may be arranged in any order and/or otherwise not structured in the same arrangement every time. The first page of such a data set, for example, may be a lab report for a first unstructured data set received, a claims form for a second unstructured data set received, and/or a cover sheet for a third unstructured data set received. In this regard, it will be appreciated that the unstructured data set of the electronic medical record(s) may include relevant data at any index, portion, or other position within the data set that is not immediately identifiable by the apparatus 400 or a human user.

According to some embodiments, the method includes extracting an identified relevant subset of the unstructured data set by processing the unstructured data set utilizing at least one high-level extractor model at operation 804. The identified relevant subset in some embodiments includes any number of data portions of the unstructured data set indicated or otherwise determined as relevant to a particular data-driven determination. For example, in some embodiments, the unstructured data set includes one or more digital page(s) of a record (e.g., an electronic medical record), and the identified relevant subset includes each page from the unstructured data set that is determined to be a particular relevant classification of page. In some embodiments, the high-level extractor model includes one or more algorithmic, statistical, and/or machine learning model that processes input data and indicates relevancy of a data portion of the unstructured data set. For example, in some embodiments, the high-level extractor model classifies particular data portion(s) of the unstructured data set and/or identifies particular data portion(s) of the unstructured data set that correspond to a particular classification, where particular classification(s) of a set of candidate classifications are determined to embody a relevant data portion. In some embodiments, the at least one high-level extractor model includes at least one specially trained text processing model that generates output data based on processing text from a particular data portion of the unstructured data set (e.g., a page of an electronic medical record). Additionally or alternatively, in some embodiments, the at least one high-level extractor model includes at least one specially trained image processing model that generates output data base at least in part on processing image data from a particular data portion of the unstructured data set. In some embodiments, the identified relevant subset includes the data portion(s) of the unstructured data set that are determined relevant based on the output of the at least one high-level extractor model(s).

According to some embodiments, the method includes extracting low-level relevant data from the identified relevant subset of the unstructured data set by processing the identified relevant subset utilizing at least one low-level extractor model at operation 806. In some embodiments, the low-level relevant data includes particular data value(s) corresponding to particular data parameter(s) that are included in the relevant data portion(s) embodied within the identified relevant subset. For example, a relevant page from the identified relevant subset of the unstructured data set may be previously-determined or otherwise expected (e.g., based on a knowledge base of data associated with a classification of the data portion, and/or the like) to include a data value representing a particular date, provider information, and/or the like that is relevant to a particular data-driven determination. Each low-level extractor model in some embodiments includes at least one algorithmic, statistical, and/or machine learning model that identifies and/or extracts particular data value(s) embodying at least a portion of low-level relevant data from a data portion of the unstructured data set. For example, in some embodiments, the low-level extractor model includes one or more specially trained machine learning model(s) that detects a portion of a page (or other data portion) within the unstructured data set that corresponds to a data value for a particular data parameter, and/or extracts the data value from the page. In some embodiments, the low-level extractor model includes at least one specially trained text processing model that generates output data based on processing text from a particular data portion of the identified relevant subset, for example where the output data incudes a particular data value extracted from the particular portion of the identified relevant subset. Additionally or alternatively, in some embodiments, the at least one low-level extractor model includes at least one specially trained image processing model that generates output data based on processing image data from a particular data portion of the identified relevant subset, for example where the output data includes a particular data value extracted from the particular portion of the identified relevant subset. In some embodiments, the high-level extractor model utilized to process a particular data portion of the identified relevant subset is determined by the apparatus 400 based on a classification or other data associated with the particular data portion, for example to enable different classifications of page(s) or other data portion(s) to be processed in a manner that is accurate for the specific classification.

According to some embodiments, the method includes generating fraud probability data by applying at least the low-level relevant data and the identified relevant subset to a fraud processing model at operation 808. In some embodiments, the fraud processing model includes at least one specially trained algorithmic, statistical, and/or machine learning model. The fraud processing model in some embodiments generates data representing a prediction of whether, and/or how likely it is, particular inputted data indicates fraudulent activity. For example, in some embodiments, the fraud processing model generates fraud probability data corresponding to a particular unstructured data set. It will be appreciated that in other embodiments, the fraud processing model may be replaced with another model specially configured to perform another data-driven determination based on a particular subset of data (e.g., embodying a focused data-based determination). In some embodiments, the apparatus 400 inputs both the identified relevant subset and the low-level relevant data to the fraud processing model for processing. Additionally or alternatively, in some embodiments, the apparatus 400 inputs one or more other portion(s) of data utilized by the fraud processing model as well, for example relevant text for one or more data portion(s), page rating data for one or more data portion(s), and/or the like as described herein.

According to some embodiments, the method includes outputting at least the fraud probability data at operation 810. In some embodiments, the apparatus 400 outputs the fraud probability data to another subsystem for processing. For example, in some embodiments, the apparatus 400 initiates one or more sub-processes based on the value of the fraud probability data (e.g., a sub-process associated with approving or denying a medical claim). Additionally or alternatively, in some embodiments, the apparatus 400 outputs the fraud probability data by causing rendering of the fraud probability data to one or more user interface(s). In some embodiments, the apparatus 400 causes rendering of the fraud probability data utilizing a particular textual, graphical, or other representation that indicates a likelihood of fraud on an absolute scale based on the value of the fraud probability data. In some embodiments, the representation of the fraud probability data is rendered utilizing a color-coded interface element that is configured based on the value of the fraud probability data (e.g., with a more-red color in a circumstance where the fraud probability data indicates more likely fraud, and a more-white or green color in a circumstance where the fraud probability indicates less likely fraud). In this regard, the apparatus 400 may cause rendering of the fraud probability data in a manner that enables a user to readily identify whether the fraud probability data indicates a prediction of more likely fraud, or not fraud, for a particular claim, code, and/or the like. It will be appreciated that the fraud probability data may be rendered to the user interface with any one or more other portions of data as depicted and described herein.

Figure 9:
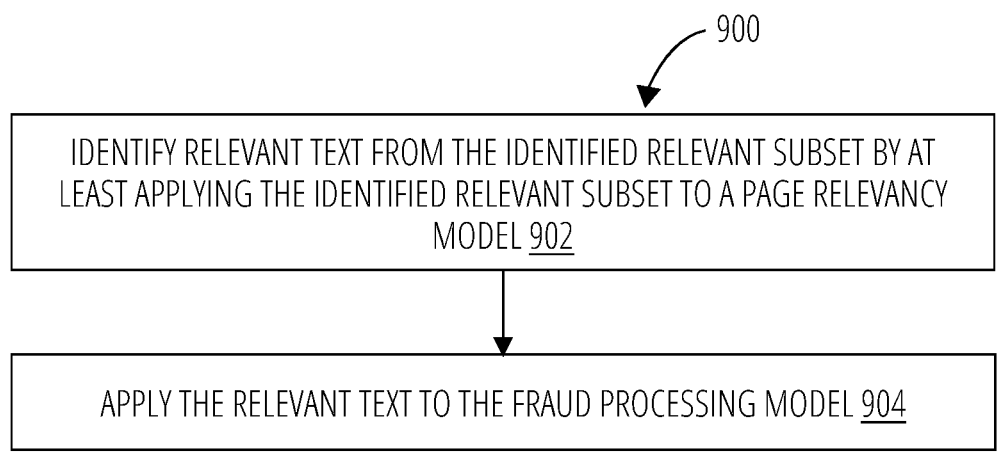
FIG. 9 illustrates a process 900 for processing relevant text utilizing a fraud processing model, for example, embodying or as a sub-process of performing at least one focused data-based determination from an unstructured data set in accordance with at least one example embodiment of the present disclosure.

FIG. 9 illustrates a process for processing relevant text utilizing a fraud processing model. In some embodiments, FIG. 9 depicts a process 900 that may embody an individual process, or embodying a sub-process as party of a process for performing at least one focused data-based determination from an unstructured data set in accordance with at least one example embodiment of the present disclosure. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 400 alone or in communication with one or more other component(s), device(s), system(s), and/or the like. In this regard, in some such embodiments, the apparatus 400 is specially configured by computer-coded instructions (e.g., computer program instructions) stored thereon, for example, in the memory 404 and/or another component depicted and/or described herein and/or otherwise accessible to the apparatus 400, for performing the operations as depicted and described. In some embodiments, the apparatus 400 is in communication with one or more external apparatus(es), system(s), device(s), and/or the like, to perform one or more of the operations as depicted and described. For example, the apparatus 400 in some embodiments is in communication with separate component(s) of a network, external network(s), and/or the like, to perform one or more of the operation(s) as depicted and described. For purposes of simplifying the description, the process 900 is described as performed by and from the perspective of the apparatus 400.

In some embodiments, the process 900 begins at operation 902. In some embodiments, the process 900 is performed as a standalone or independent process together with one or more of the other processes described herein. Additionally or alternatively, in some embodiments, the process 900 begins after one or more operations depicted and/or described with respect to any of the other processes described herein. For example, in some embodiments as depicted, the process 900 after execution of operation 806. In this regard, some or all of the process 900 may replace or supplement one or more blocks depicted and/or described with respect to any of the other processes described herein. For example, in some embodiments as depicted, the process 900 supplants, supplements, and/or otherwise replaces an operation of the process 800. Additionally or alternatively, as depicted, upon completion of the process 900, flow may return to one or more operations of another process. For example, as depicted, flow may return to operation 810 as depicted and described.

According to some embodiments, the method includes identifying relevant text from the identified relevant subset at operation 902. In some embodiments, the apparatus 400 identifies the relevant text by at least applying the identified relevant subset to a page relevancy model. In some embodiments, the page relevancy model includes at least one algorithmic, statistical, and/or machine learning model that extracts text from one or more portion(s) of an unstructured data set that contributes to the relevancy of the data portion. In some embodiments, the page relevancy model identifies particular text from within a portion of data in the unstructured data set (e.g., a page) that corresponds to one or more code(s) identified within the data portion. The page relevancy model in some embodiments additionally or alternatively identifies the code(s) from within data portion(s) of the unstructured data set for further processing, for example, to identify corresponding relevant text. In some embodiments the page relevancy model includes or is embodied at least in part by at least one text processing model and/or at least one image processing model. A non-limiting example of a page relevancy model is depicted and described with respect to FIG. 13.

According to some embodiments, the method includes applying the relevant text to the fraud processing model at operation 904. In some embodiments, the fraud processing model inputs the relevant text for one or more data portion(s) of the unstructured data set to the fraud processing model to generate fraud probability data based on such relevant text. In some embodiments, the relevant text corresponding to a particular data portion of the unstructured data set is applied as input to the fraud processing model. The relevant text in some embodiments is concatenated or otherwise combined with any other of the one or more other portion(s) of data processed by the fraud processing model, as depicted and described herein.

Figure 10:
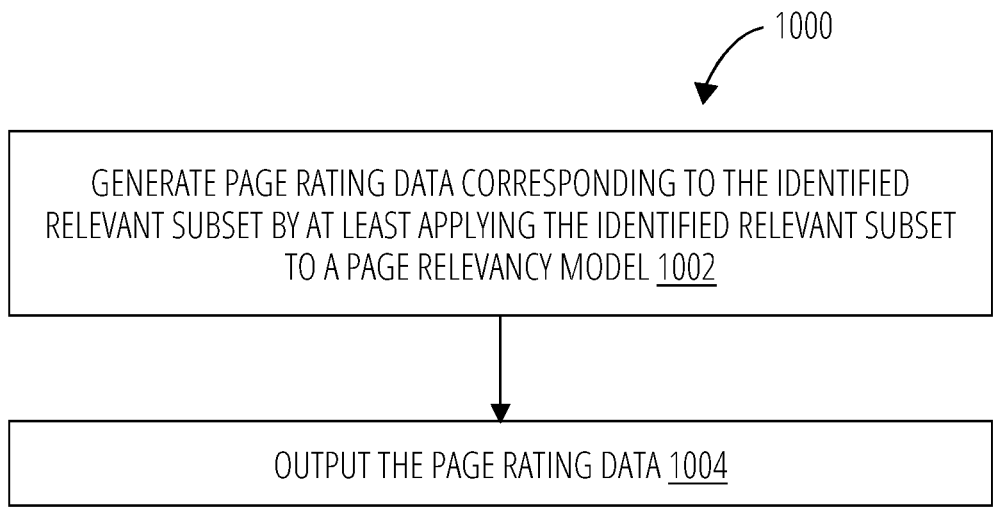
FIG. 10 illustrates a process 1000 for outputting page rating data, for example, embodying or as a sub-process of performing at least one focused data-based determination from an unstructured data set in accordance with at least one example embodiment of the present disclosure.

FIG. 10 illustrates a process for outputting page rating data. In some embodiments, FIG. 10 depicts a process 1000 that may embody an individual process, or embodying a subprocess of performing at least one focused data-based determination from an unstructured data set in accordance with at least one example embodiment of the present disclosure. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 400 alone or in communication with one or more other component(s), device(s), system(s), and/or the like. In this regard, in some such embodiments, the apparatus 400 is specially configured by computer-coded instructions (e.g., computer program instructions) stored thereon, for example, in the memory 404 and/or another component depicted and/or described herein and/or otherwise accessible to the apparatus 400, for performing the operations as depicted and described. In some embodiments, the apparatus 400 is in communication with one or more external apparatus(es), system(s), device(s), and/or the like, to perform one or more of the operations as depicted and described. For example, the apparatus 400 in some embodiments is in communication with separate component(s) of a network, external network(s), and/or the like, to perform one or more of the operation(s) as depicted and described. For purposes of simplifying the description, the process 1000 is described as performed by and from the perspective of the apparatus 400.

In some embodiments, the process 1000 begins at operation 1002. In some embodiments, the process 1000 is performed as a standalone or independent process together with one or more of the other processes described herein. Additionally or alternatively, in some embodiments, the process 1000 begins after one or more operations depicted and/or described with respect to any of the other processes described herein. For example, in some embodiments as depicted, the process 1000 after execution of operation 704 and/or operation 804. In this regard, some or all of the process 1000 may replace or supplement one or more blocks depicted and/or described with respect to any of the other processes described herein. For example, in some embodiments as depicted, the process 1000 supplants, supplements, and/or otherwise replaces an operation of the process 800. Additionally or alternatively, as depicted, upon completion of the process 1000, flow may return to one or more operations of another process. For example, as depicted, flow may return to operation 706 and/or operation 806 as depicted and described.

According to some embodiments, the method includes generating page rating data corresponding to the identified relevant subset at operation 1002. The page rating data in some embodiments represents a score or data value indicating the relevancy of a particular data portion of the unstructured data set. The page rating data may be represented on an objective scale (e.g., 0 to 300 with 300 representing highly relevant, 0 to 5 stars with 5 stars representing highly relevant, and/or the like), or in some embodiments may be represented on a relative scale (e.g., data values where a lower data value indicates less relevance, for example). In some embodiments, the apparatus 400 generates the page rating data by at least applying the identified relevant subset to a page relevancy model. In some embodiments, the page relevancy model includes at least one algorithmic, statistical, and/or machine learning model that processes data portion(s) of an unstructured data set, and/or data associated therewith, to generate page rating data corresponding to such data portion(s). A non-limiting example of a page relevancy model is depicted and described with respect to FIG. 13.

According to some embodiments, the method includes outputting the page rating data at operation 1004. In some embodiments, the apparatus 400 outputs the page rating data to another subsystem for processing. For example, in some embodiments the page rating data is outputted to a fraud processing model for further processing. Additionally or alternatively, in some embodiments, the apparatus 400 outputs the page rating data by causing rendering of the page rating data to one or more user interface(s). In some embodiments, the apparatus 400 causes rendering of the page rating data in a manner that provides access to viewing the data portion, and indicates the relevancy of the data portion by depicting a representation of the page rating data corresponding to that data portion. In some embodiments, the page rating data is rendered via a user interface element including a number of stars from one to a maximum number of stars, a sliding scale indicating high relevance at one end of the slide and nonrelevance at the other end of the slide, and/or the like. In this regard, the page rating data may be rendered in a manner that enables a corresponding user of the user interface to readily assess the relevancy of a particular data portion based on the corresponding page rating data, and access the data portion if desired with minimal user interaction (e.g., a single click, for example).

Figure 11:
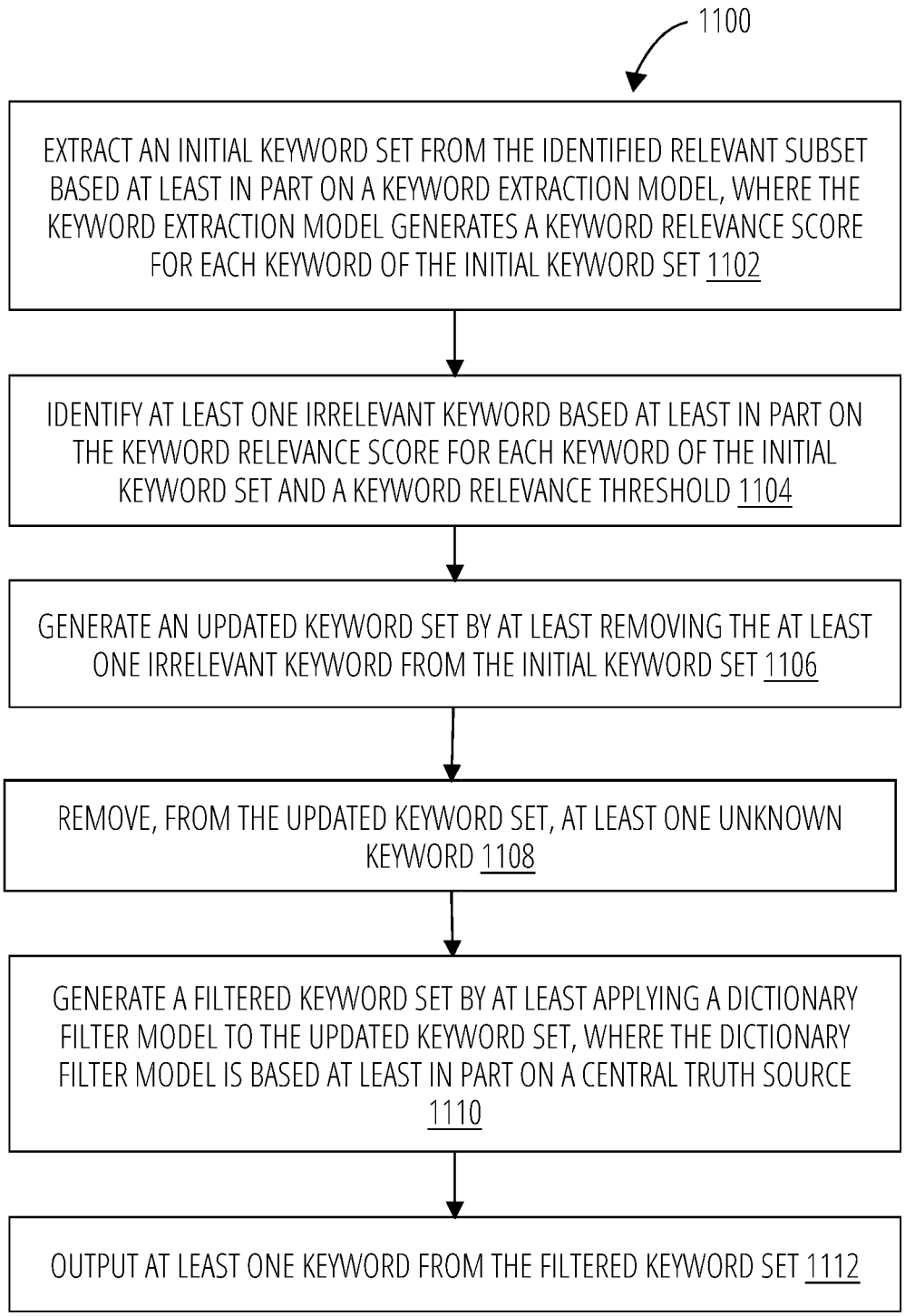
FIG. 11 illustrates a process 1100 for generating improved keyword(s), for example, embodying or as a sub-process of performing at least one focused data-based determination from an unstructured data set in accordance with at least one example embodiment of the present disclosure.

FIG. 11 illustrates a process for generating improved keyword(s). In some embodiments, FIG. 11 depicts a process 1100 that may embody an individual process, or embodying a sub-process as part of a process for performing at least one focused data-based determination from an unstructured data set in accordance with at least one example embodiment of the present disclosure. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the apparatus 400 alone or in communication with one or more other component(s), device(s), system(s), and/or the like. In this regard, in some such embodiments, the apparatus 400 is specially configured by computer-coded instructions (e.g., computer program instructions) stored thereon, for example, in the memory 404 and/or another component depicted and/or described herein and/or otherwise accessible to the apparatus 400, for performing the operations as depicted and described. In some embodiments, the apparatus 400 is in communication with one or more external apparatus(es), system(s), device(s), and/or the like, to perform one or more of the operations as depicted and described. For example, the apparatus 400 in some embodiments is in communication with separate component(s) of a network, external network(s), and/or the like, to perform one or more of the operation(s) as depicted and described. For purposes of simplifying the description, the process 1100 is described as performed by and from the perspective of the apparatus 400.

In some embodiments, the process 1100 begins at operation 1102. In some embodiments, the process 1100 is performed as a standalone or independent process together with one or more of the other processes described herein. Additionally or alternatively, in some embodiments, the process 1100 begins after one or more operations depicted and/or described with respect to any of the other processes described herein. For example, in some embodiments as depicted, the process 1100 after execution of operation 704 and/or operation 804. In this regard, some or all of the process 1100 may replace or supplement one or more blocks depicted and/or described with respect to any of the other processes described herein. For example, in some embodiments as depicted, the process 1100 supplants, supplements, and/or otherwise replaces an operation of the process 800. Additionally or alternatively, as depicted, upon completion of the process 1100, flow may return to one or more operations of another process. For example, as depicted, flow may return to operation 706 and/or operation 806 as depicted and described.

According to some embodiments, the method includes extracting an initial keyword set from the identified relevant subset based on a keyword extraction model at operation 1102. In some embodiments, the initial keyword set includes one or more keyword(s) that is/are determined to provide explainability to a model, for example, a fraud processing model. In some embodiments, the keyword extraction model includes at least one attention model, a local interpretable model-agnostic explanation (LIME) mechanism, a Shapley value explainability mechanism, and/or another keyword explainability model. In some embodiments, the keyword extraction model identifies particular data within a page (or other data portion) within an unstructured data set that are associated with, contribute to, or otherwise explain features of the fraud processing model (or another model). In some embodiments, the keyword extraction model includes one or more specially trained algorithmic, statistical, and/or machine learning model(s).

In some embodiments the keyword extraction model 516 relies on or otherwise communicates with the fraud processing model 508. For example, in some embodiments, the keyword extraction model 516 receives input from the fraud processing model 508, either directly as output of the fraud processing model 508 and/or via interrogation or other subsequent processing of the fraud processing model 508. In some such embodiments, for example embodiments that utilize LIME, attention layer(s), and/or similar mechanism(s), the fraud processing model 508 provides an initial set of keywords to the keyword extraction model 516. Additionally or alternatively, in some such embodiments, for example embodiments that utilize LIME, attention layer(s), and/or similar mechanism(s), the keyword extraction model 516 interrogates the fraud processing model 508 upon completion of training and/or operation of the fraud processing model 508 to identify the initial set of keywords corresponding to the fraud processing model 508. In yet some other embodiments, the keyword extraction model 516 receives or otherwise identifies the initial keyword set utilizing any other mechanism and/or data available to the keyword extraction model 516.

In some embodiments, the keyword extraction model generates a keyword relevance score for each keyword in the initial keyword set. In some embodiments, the keyword relevance score indicates a relevance of the keyword on the operation of a corresponding model (e.g., the fraud processing model). In this regard, the apparatus 400 may maintain a keyword relevance score set that includes the keyword relevance score corresponding to each keyword of the initial keyword set.

According to some embodiments, the method includes identifying at least one irrelevant keyword at operation 1104. In some embodiments, the apparatus 400 identifies the at least one irrelevant keyword based on the keyword relevance score for each keyword of the initial keyword set and a keyword relevance threshold. For example, in some embodiments the apparatus 400 compares the keyword relevance score for each keyword with the keyword relevance threshold. In some such embodiments, the apparatus 400 may identify each keyword that is associated with a keyword relevance score that does not satisfy the keyword relevance threshold as an irrelevant keyword. For example, in some embodiments, each keyword associated with a keyword relevance score that falls below the keyword relevance threshold is identified as an irrelevant keyword.

In some embodiments, the keyword relevance threshold is predetermined or otherwise maintained by the apparatus 400. Additionally or alternatively, in some embodiments, the apparatus 400 determines the keyword relevance threshold, for example dynamically based on the keyword relevance scores for one or more keywords in the initial keyword set. For example, in some embodiments, the apparatus 400 generates the keyword relevance threshold such that a target amount or percentage of keywords fall above the keyword relevance threshold (e.g., each embodying a relevant keyword, with each other keyword embodying an irrelevant keyword).

According to some embodiments, the method includes generating an updated keyword set by at least removing the at least one irrelevant keyword from the initial keyword set at operation 1106. In some embodiments, the apparatus 400 deletes each irrelevant keyword from the initial keyword set, such that the updated initial keyword set embodies the updated keyword set. Additionally or alternatively, in some embodiments, the apparatus 400 generates a new data object embodying the updated keyword set, where the new data object includes all other items from the initial keyword set without the identified irrelevant keywords.

According to some embodiments, the method includes removing, from the updated keyword set, at least one unknown keyword at operation 1108. In some embodiments, the apparatus 400 removes the at least one unknown keyword based on a known dictionary and/or a relevant keyword corpus. For example, in some embodiments, the apparatus 400 removes each keyword from the updated keyword set that is not found or otherwise determined present in the known dictionary and/or the relevant keyword corpus. In some embodiments, the apparatus 400 generates and/or maintains the dictionary utilized for removing unknown keywords, for example, based on automatically determined or user provided relevant keywords and/or other data. In some embodiments, the apparatus 400 deletes each unknown keyword from the updated keyword set. In other embodiments, the apparatus 400 generates a new data object embodying each other keyword in the updated keyword set that was found or determined present in the known dictionary and/or the relevant keyword corpus.

According to some embodiments, the method includes generating a filtered keyword set by at least applying a dictionary filter model to the updated keyword set at operation 1110. In some embodiments, the dictionary filter model operates based on a central truth source, for example, such that the dictionary filter model filters out keywords that are dissimilar from a central truth source. For example, in some embodiments, the central truth source embodies or includes a trusted dictionary of terms utilized across a particular model domain. In the example context of health care, in some embodiments the central truth source embodies medical code descriptions or the like retrieved from UMLS. In some embodiments, the dictionary filter model generates a score indicating similarity between a keyword in the updated keyword set and the central truth source. In some such embodiments, the apparatus 400 filters out or otherwise removes each keyword associated with a score that does not satisfy another corresponding threshold, for example, a central truth similarity threshold. In some embodiments, the dictionary filter model generates the filtered keyword set by deleting particular keyword(s) from the updated keyword set (e.g., each keyword determined dissimilar to the central truth source, based on a corresponding score and threshold, or otherwise), and/or generating a new data object including each keyword in the updated keyword set that is not filtered out (e.g., each keyword of the updated keyword set that is determined to be similar to the central truth source).

According to some embodiments, the method includes outputting at least one keyword from the filtered keyword set at operation 1112. In some embodiments, the apparatus 400 outputs each keyword in the filtered keyword set. Additionally or alternatively, in some embodiments, the apparatus 400 outputs a particular percentage or number of keywords from the filtered keyword set. For example, in some embodiments, the apparatus 400 outputs a top X keywords from the filtered keyword set, where X represents a determined or predetermined number, or top Y percentage of keywords from the filtered keyword set, where Y represents a percentage (e.g., keywords that remain in the filtered keyword set and are associated with the highest keyword relevance score).

Figure 12:
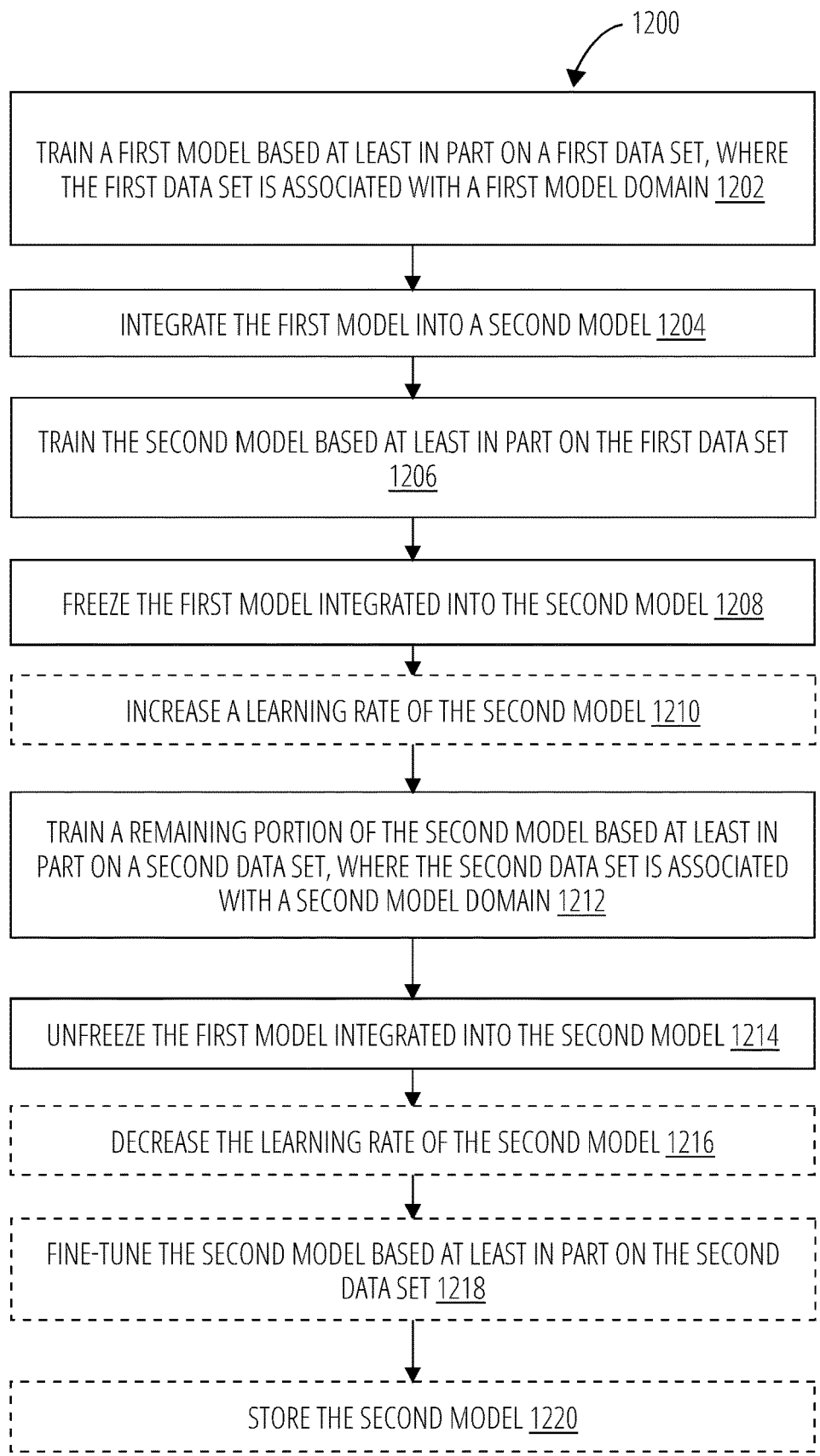
FIG. 12 illustrates a process 1200 for improved model training for improved performance, for example, embodying or as a sub-process of performing at least one focused data-based determination from an unstructured data set in accordance with at least one example embodiment of the present disclosure.

FIG. 12 illustrates a process for improved model training for improved performance. In some embodiments, FIG. 12 depicts a process 1200 that may embody an individual process, or embodying a sub-process as part of a process for performing at least one focused data-based determination from an unstructured data set in accordance with at least one example embodiment of the present disclosure. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the apparatus 400 alone or in communication with one or more other component(s), device(s), system(s), and/or the like. In this regard, in some such embodiments, the apparatus 400 is specially configured by computer-coded instructions (e.g., computer program instructions) stored thereon, for example, in the memory 404 and/or another component depicted and/or described herein and/or otherwise accessible to the apparatus 400, for performing the operations as depicted and described. In some embodiments, the apparatus 400 is in communication with one or more external apparatus(es), system(s), device(s), and/or the like, to perform one or more of the operations as depicted and described. For example, the apparatus 400 in some embodiments is in communication with separate component(s) of a network, external network(s), and/or the like, to perform one or more of the operation(s) as depicted and described. For purposes of simplifying the description, the process 1200 is described as performed by and from the perspective of the apparatus 400. For example, in some embodiments, the apparatus 400 performs the process 1200 to specially train a fraud processing model utilized as depicted and described herein.

In some embodiments, the process 1200 begins at operation 1202. In some embodiments, the process 1200 is performed as a standalone or independent process together with one or more of the other processes described herein. Additionally or alternatively, in some embodiments, the process 1200 begins after one or more operations depicted and/or described with respect to any of the other processes described herein. For example, in some embodiments as depicted, the process 1200 at or before execution of operation 802. In this regard, some or all of the process 1200 may replace or supplement one or more blocks depicted and/or described with respect to any of the other processes described herein. For example, in some embodiments as depicted, the process 1200 supplants, supplements, and/or otherwise replaces an operation of the process 800. Additionally or alternatively, as depicted, upon completion of the process 1200, flow may return to one or more operations of another process. For example, as depicted, flow may return to operation 802 as depicted and described.

According to some embodiments, the method includes training a first model based on a first data set at operation 1202. In some embodiments, the first data set is associated with a first model domain. In this regard, the first data set may be collected with particular data values and/or features that are particular to the first model domain. In the context of healthcare claims processing, for example, the first model may embody a CPT model that is trained based at least on medical codes and corresponding data. Continuing this context, the first model domain may embody waste and error detection, where the first data set includes one or more data record(s) embodying waste and error data including any number of data values relevant to detecting waste and error in medical claims processing. In some embodiments, the apparatus 400 receives, retrieves, and/or otherwise identifies the first data set by receiving at least a portion of the first data set from an external system, automatically retrieving at least a portion of the first data set from an external system or from a data repository accessible to the apparatus 400 directly, and/or generating the first data set over time based on received and/or processed data. In some embodiments, the first model includes or embodies a machine learning model including one or more layer(s) that is/are trained based on data patterns, trends, and/or other learnings detected from the first data set.

According to some embodiments, the method includes integrating the first model into a second model at operation 1204. In some embodiments, the second model includes or embodies a machine learning model including one or more layer(s). In some such embodiments, the apparatus 400 may integrate the first model into the second model by aligning or otherwise connecting layer(s) of the first model with one or more layer(s) of the second model. Additionally or alternatively, in some embodiments, the first model is integrated into the second model utilizing another model integration mechanism and/or architecture. Upon completion of the integration, the apparatus 400 maintains the second model including the first model (and/or layer(s) or weight(s) thereof as a sub-model of the second model).

According to some embodiments, the method includes training the second model based on the first data set at operation 1206. In some embodiments, the apparatus 400 applies the first data set to the second model to train the second model. During training, the second model may re-weight one or more layer(s), node(s), and/or the like based on data pattern(s), trend(s), and/or other learning(s) identified from the first data set. It will be appreciated that any of a myriad of known training mechanisms may be utilized to train the second model.

According to some embodiments, the method includes freezing the first model integrated into the second model at operation 1208. In this regard, the apparatus 400 may freeze the first model in any way that prevents subsequent updating of the weight(s) for layer(s) of the first model. In some embodiments, the apparatus 400 freezes the first model by altering the learning rate of the first model (and/or layers associated with the first model) to a particular value (e.g., zero) to prevent changes in the weights of the first model. In this regard, once frozen, the first model may not further be updated by subsequent training while the first model remains frozen.

According to some embodiments, the method includes increasing a learning rate of the second model at optional operation 1210. In this regard, the apparatus 400 may increase the learning rate to enhance the effects of subsequent training data on weighting of layer(s) embodying the second model that remain unfrozen specifically. In some embodiments, the learning rate may be increased to a set value, increased by a particular proportion, and/or the like. The increase in learning rate may not affect any of the frozen layers of the second model (e.g., may not affect each layer corresponding to the first model that was frozen at operation 1208).

According to some embodiments, the method includes training a remaining portion of the second model based on a second data set at operation 1212. In this regard, the apparatus 400 may continue to train the layer(s) of the second model that remain unfrozen (e.g., those that were not frozen at operation 1208 for example). In some embodiments, the remaining portion of the second model corresponds to all layers of the second model that were not frozen.

In some embodiments, the second data set is associated with a second model domain. In this regard, the second data set may be collected with particular data values and/or features that are particular to the second model domain. Continuing the context of healthcare claims processing, for example, the second model domain may embody fraud detection, where the second data set includes one or more data record(s) embodying fraud data including any number of data values relevant to detecting fraudulent claims submission in medical claims processing. In some embodiments, the apparatus 400 receives, retrieves, and/or otherwise identifies the second data set by receiving at least a portion of the second data set from an external system, automatically retrieving at least a portion of the second data set from an external system or from a data repository accessible to the apparatus 400 directly, and/or generating the second data set over time based on received and/or processed data. In some embodiments, the first model includes or embodies a machine learning model including one or more layer(s). In this regard, the second model includes or embodies a machine learning model including one or more layer(s) that continue to be trained based on data patterns, trends, and/or other learnings detected from the second data set.

In some embodiments, the second data set is materially distinct from the first data set in one or more ways. For example, in some embodiments, the first data set may include substantially more data record(s) and/or value(s). In some such contexts, the first data set may include a larger number of data record(s) (e.g., a multiple larger, an order of magnitude larger, and/or the like) due to the availability of such data, for example where data represented in the first data set corresponds to a first event that occurs with greater frequency than a second data event corresponding to data represented in the second data set. Additionally or alternatively, in some contexts, the first data set and the second data set may be associated with different levels of stability in the underlying data types and/or relevant features for processing such data sets. For example, in some contexts the particular relevant features associated with the first data set and the second data set may differ in stability where the first data set is associated with particular data features that remain relatively stable over time, and where the second data set is associated with data features that are comparatively unstable, for purposes of making a particular data-driven determination.

One such example context includes a first data set corresponding to waste & error data in processing medical claims and records data, and a second data set corresponding to fraud data in processing medical claims and records data. In such a context, waste & error data may be more widely available due to the fact that waste & error events occur with relative frequency as compared to other event(s) affecting the results of medical claims processing. Additionally, waste & error data may correspond to features that are relatively stable, as the underlying reasons and features corresponding thereto for waste & error events do not frequently adjust with significance. However, waste & error data may include data that is usable to accurately perform a determination of whether particular input data represents waste & error, but often does not include the same trend(s), feature(s), and/or other underlying data value(s) that support a determination of fraudulent claims processing actions. Comparatively, the fraud data may be less available due to the fact that fraud events occur with less frequency than waste & error events in medical claims processing. However, fraud data may correspond to features that are more unstable, as the underlying reasons and features corresponding thereto for fraud events may frequently change as new types of frauds are attempted by different entities (e.g., claimants, providers, and/or the like). In this regard, the fraud data may be particularly unstable, but well-targeted too accurately perform a determination of whether input data represents a particular type of fraud.

In this regard, the first data set corresponds to a different domain (e.g., a first domain of waste & error) than the second data set corresponding to a different domain (e.g., a second domain of fraud). However, certain overlaps between the domains (e.g., both having to do with processing of medical claims and associated data, for example an unstructured data set representing medical record(s) of a particular patient) enables partial leveraging of the first data set corresponding to the first domain to improve the generalizability of a model and improve the universe of training data available for use with that model. Additionally, by leveraging learnings based at least in part on the two domains (e.g., utilizing a first model trained on the first data set for a first overlapping domain and a second model trained based at least in part on the second data set for a specific domain for which a data-driven determination is to be made) to generate a combined or otherwise integrated model, embodiments of the present disclosure leverage the advantages of each of such domains in producing a result for a specific domain.

According to some embodiments, the method includes unfreezing the first model integrated into the second model at operation 1214. In this regard, the apparatus 400 may unfreeze the first model in any way that restores the ability of the first model to update the weight(s) for layer(s) of the first model. In some embodiments, the apparatus 400 unfreezes the first model by altering the learning rate of the first model (and/or layers associated with the first model) to a second particular value or returning the learning value to the value it was set to before freezing. In this regard, the first model may continue to be updated by subsequent training once the first model is unfrozen.

According to some embodiments, the method includes decreasing the learning rate of the second model at optional operation 1216. In some embodiments, the learning rate associated with the second model is set to a predetermined rate utilize for fine-tuning. For example, in some embodiments, the learning rate is set to a predetermined value, reduced by a particular percentage, and/or the like. In some embodiments, the learning rate is reduced until it falls within a particular range (e.g., a range maintained by the apparatus 400 for fine-tuning).

According to some embodiments, the method includes fining-tune the second model based on the second data set at optional operation 1218. In some embodiments, the second model (including the integrated first model) is fine-tuned based on a loss function. For example, in some embodiments, the apparatus 400 fine-tunes all layers of the second model based on a binary cross-entropy loss function or log-loss function. It will be appreciated that, in other embodiments, the apparatus 400 may utilize any other loss function or algorithm for fine-tuning the second model.

According to some embodiments, the method includes storing the second model at optional operation 1220. In some embodiments, the apparatus 400 stores the second model to a memory of the apparatus 400 for subsequent use. For example, in some embodiments, the apparatus 400 stores the second model as a fraud processing model as depicted and described herein. Additionally or alternatively, in some embodiments, the apparatus 400 stores the second model to another system or device that utilizes the second model for processing, for example, as a fraud processing model.

Figure 13:
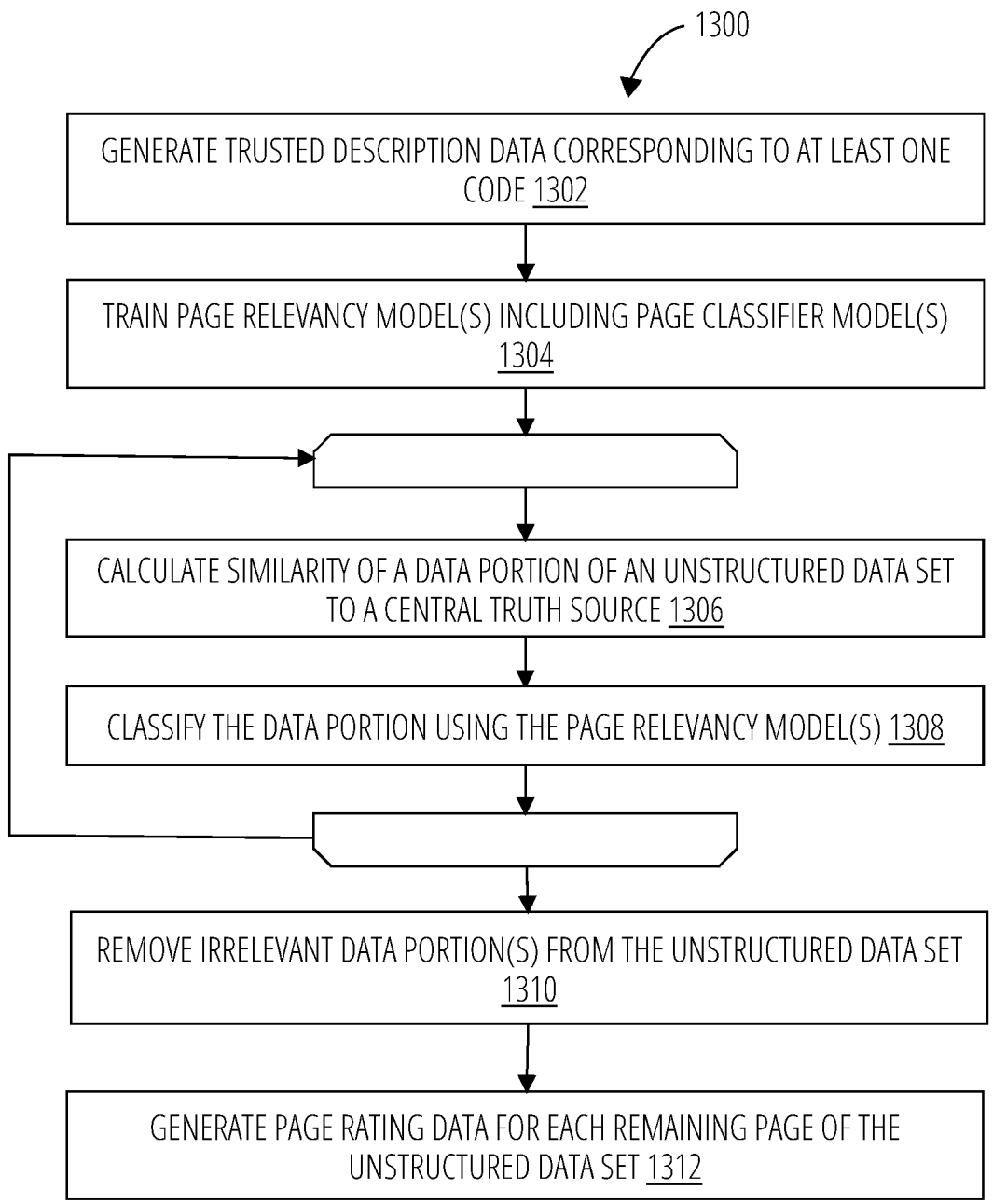
FIG. 13 illustrates a process 1300 for generating page rating data for one or more portion(s) of an unstructured data set, for example, embodying or as a sub-process of performing at least one focused data-based determination from an unstructured data set in accordance with at least one example embodiment of the present disclosure.

FIG. 13 illustrates a process for generating page rating data for one or more portion(s) of an unstructured data set. In some embodiments, FIG. 13 depicts a process 1300 that may embody an individual process, or embodying a sub-process as part of a process for performing at least one focused data-based determination from an unstructured data set in accordance with at least one example embodiment of the present disclosure. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the apparatus 400 alone or in communication with one or more other component(s), device(s), system(s), and/or the like. In this regard, in some such embodiments, the apparatus 400 is specially configured by computer-coded instructions (e.g., computer program instructions) stored thereon, for example, in the memory 404 and/or another component depicted and/or described herein and/or otherwise accessible to the apparatus 400, for performing the operations as depicted and described. In some embodiments, the apparatus 400 is in communication with one or more external apparatus(es), system(s), device(s), and/or the like, to perform one or more of the operations as depicted and described. For example, the apparatus 400 in some embodiments is in communication with separate component(s) of a network, external network(s), and/or the like, to perform one or more of the operation(s) as depicted and described. For purposes of simplifying the description, the process 1300 is described as performed by and from the perspective of the apparatus 400.

In some embodiments, the process 1300 begins at operation 1302. In some embodiments, the process 1300 is performed as a standalone or independent process together with one or more of the other processes described herein. Additionally or alternatively, in some embodiments, the process 1300 begins after one or more operations depicted and/or described with respect to any of the other processes described herein. For example, in some embodiments as depicted, the process 1300 after execution of operation 704 or operation 804. In this regard, some or all of the process 1300 may replace or supplement one or more blocks depicted and/or described with respect to any of the other processes described herein. For example, in some embodiments as depicted, the process 1300 supplants, supplements, and/or otherwise replaces an operation of the process 800. Additionally or alternatively, as depicted, upon completion of the process 1300, flow may return to one or more operations of another process. For example, as depicted, flow may return to operation 706 or operation 806 as depicted and described. In some such embodiments, the apparatus 400 performs the process 1300 to train the fraud processing model depicted and described with respect to FIG. 6.

According to some embodiments, the method includes generating trusted description data corresponding to at least one code at operation 1302. In some embodiments, the apparatus 400 extracts, identifies, or otherwise receives the at least one code by processing the unstructured data set or one or more data portion(s) thereof. For example, in some embodiments the apparatus 400 utilizes the high-level extractor model and/or low-level extractor model to extract the at least one code from one or more data portion(s) of the unstructured data set. In some embodiments, the trusted description data represents text and/or other data for comparison associated with a particular keyword. In some embodiments, the apparatus 400 generates the trusted description data by identifying such text from a central truth source for each identified code of the at least one code. For example, in some embodiments, the apparatus 400 generates the trusted description data based on identifying a text description from UMLS corresponding to each code, and/or a parent description or ancestor description corresponding to the code.

According to some embodiments, the method includes training page relevancy model(s) including page classifier model(s) at operation 1304. The page classifier model in some embodiments includes at least one algorithmic, statistical, and/or machine learning model trained to generate a classification of a particular data portion of an unstructured data set. The classification in some embodiments represents a data value from a set of candidate classifications. For example, the candidate classifications may include any number of known page types, such as a lab order, claim form, cover sheet, and/or the like. In some embodiments, the apparatus 400 or another system trains the page classifier model based on training data corresponding to known classification(s) for data portions of an unstructured data set. In some embodiments, a page classifier model embodies a high-level extractor model as depicted and described herein.

In some embodiments, the apparatus 400 utilizes the trusted description data and the page relevancy model(s) including the page classifier model(s) for one or more instances of further processing an unstructured data set. For example, in some embodiments, the apparatus 400 performs a subsequent sub-process for processing a plurality of medical claims, for example, embodied by the operations 1306 to 1308. In this regard, in some embodiments, the apparatus 400 repeats the operations 1306 and 1308 for each claim line of a particular claim to be processed, and for each data portion of an unstructured data set.

According to some embodiments, the method includes calculating similarity of a data portion of an unstructured data set to a central truth source at operation 1306. In some embodiments, the apparatus 400 calculates a score representing the similarity of the data portion of the unstructured data set to the trusted description data generated at operation 1302, for example. In some embodiments, the apparatus 400 compares the data portion of the unstructured data set to the trusted description data to determine the score representing the similarity. Additionally or alternatively, in some embodiments, the apparatus 400 calculates the similarity of the data portion utilizing a specially configured algorithmic, statistical, and/or machine learning model that calculates the score representing the similarity between the data portion of the unstructured data set and the trusted description data.

According to some embodiments, the method includes classifying at least one data portion of the unstructured data set using page relevancy model(s) at operation 1308. For example, in some embodiments, the apparatus 400 classifies a page embodying the data portion of the unstructured data set. In some such embodiments, the apparatus 400 generates a classification corresponding to the data portion of the unstructured data set from a set of candidate classifications. In some embodiments, the classification is generated by the apparatus 400 by applying the data portion of the unstructured data set to the page classifier model(s).

In some embodiments, the apparatus 400 classifies only particular data portions of an unstructured data set. For example, in some embodiments, the apparatus 400 attempts to classify data portions and only generates a classification for each known data portion of the unstructured data set (e.g., where the page classifier model(s) generate a certain classification, for example). In this regard, remaining data portions that are not associated with a certain or otherwise known classification may remain unclassified.

In some embodiments, one or more high-level extractor(s) perform page classification as, or in place of, the page classifier model(s). For example, in some embodiments, a high-level extractor may be specially configured to identify a particular portion of an unstructured data set (e.g., a page in an electronic record) as representing a particular classification of data (e.g., a lab report). In some such embodiments, multiple high-level extractor(s) may be specially configured to identify different classifications, and/or a single high-level extractor may be specially configured to identify multiple classifications. In some such embodiments, one or more classifications may be determinable as representing a relevant data portion of the unstructured data set. For example, in some contexts, embodiments of the present disclosure may utilize a high-level extractor to identify particular portion(s) of an unstructured data set that represent a lab report page, where such embodiments determine (e.g., based on predetermined data, user input, automatic data-driven determination(s), and/or the like) that any lab report page constitutes a relevant data portion of the unstructured data set. In some such embodiments, data portion(s) corresponding to different page classifications, including those identified by high-level extractor(s), may thus be indicated as relevant regardless of the scoring and/or results as described with respect to operations 1306 and 1308. Alternatively, in some embodiments, the classification and/or other data outputted from the high-level extractor(s) may be utilized to generate a score utilized for determining relevancy of the data portion. In some embodiments, in a circumstance where a portion of data is determined relevant based at least in part on a classification or other output from a high-level extractor, one or more of such operation(s) may be skipped for processing that data portion to attempt to determine relevancy via other mechanism(s). Alternatively, in a circumstance where a data portion is not determined relevant based at least in part on a classification or other output from a high-level extractor at a previous step, in some embodiments the other operations as described above may provide an alternative path to indicating a particular data portion is relevant. Additionally or alternatively, in some embodiments, one or more high level extractor(s) may explicitly determine data portion(s) as irrelevant, and thereby cause such data portion(s) to be skipped with respect to generating relevancy based on a centralized truth source.

According to some embodiments, the method includes removing irrelevant data portion(s) from the unstructured data set at operation 1310. For example, in some embodiments, the irrelevant data portion(s) include one or more data portion(s) associated with particular classification(s). In some such embodiments, the apparatus 400 may maintain data representing predefined or otherwise determined classification(s) indicated as irrelevant with respect to a particular focused data-based determination, such that the apparatus 400 may remove each data portion associated with such an irrelevant classification. Additionally or alternatively, in some embodiments, the apparatus 400 determines data portion(s) of the unstructured data set that are not indicated by data maintained by the apparatus 400 as relevant. For example, in some embodiments, the apparatus 400 maintains data representing predefined or otherwise determined classification(s) indicated as relevant with respect to a particular focused data-based determination, such that the apparatus 400 may remove each data portion associated with any other classification other than the classifications deemed relevant. In some embodiments, the relevant classifications from a set of candidate classifications is predetermined, automatically defined, or in some embodiments represented by user input.

Additionally or alternatively still, in some embodiments, the irrelevant data portion(s) includes one or more data portion(s) determined to be irrelevant based on dissimilarity to corresponding trusted description data. In some such embodiments, the apparatus 400 may identify irrelevant data portion(s) by identifying each data portion associated with a similarity score that does not satisfy a corresponding threshold. For example, in some embodiments, the apparatus 400 utilizes the similarity score generated at operation 1306 to identify irrelevant data portion(s), such as the data portion(s) corresponding to a similarity score that falls below (or otherwise does not satisfy a corresponding threshold).

In some embodiments, for example, the apparatus 400 removes each irrelevant data portion from the unstructured data set by deleting the data portion(s) from the unstructured data set to generate an updated unstructured data set. Additionally or alternatively, in some embodiments, the apparatus 400 marks each irrelevant data portion in the unstructured data set to prevent subsequent processing of such data portion(s), for example, by a fraud processing model as depicted and described herein. Additionally or alternatively still, in some embodiments, the apparatus 400 generates a new data object embodying the unstructured data set with irrelevant data portions removed, for example, where the new data object includes all other items from the unstructured data set without the irrelevant data portions.

According to some embodiments, the method includes generating page rating data for each remaining page of the unstructured data set at operation 1312. In some embodiments, the page rating data embodies or is set to the data value of the similarity score generated at operation 1306. Additionally or alternatively, in some embodiments, the apparatus 400 sets the page rating data to a particular value based on one or more of the code being processed, classification associated with the data portion, and/or other data available to the apparatus 400. For example, in some embodiments, the apparatus 400 sets page rating data for a data portion of a particular classification to a predetermined value. In some embodiments, the predetermined value is based on the classification and/or the code being processed. For example, the apparatus 400 may be configured such that page rating data for a first data portion of a first classification is set to a first particular value in a circumstance where a first type of code is being processed, and is set to a second particular value for the same classification in a circumstance where a second type of code is being processed.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   integrating, by one or more processors, a first model into a second model by connecting one or more layers of the first model to one or more layers of the second model, wherein the first model has been trained based at least in part on a first data set and the first data set is associated with a first model domain;
   training, by the one or more processors, a first portion of the second model based at least in part on the first data set;
   freezing, by the one or more processors, the first model integrated into the second model; and
   training, by the one or more processors, a second portion of the second model based at least in part on a second data set, wherein the second data set is associated with a second model domain that is different than the first model domain.

2. The computer-implemented method of claim 1, further comprising:
   unfreezing the first model integrated into the second model; and
   fine-tuning the second model based at least in part on the second data set.

3. The computer-implemented method of claim 1, further comprising:
   storing the second model.

4. The computer-implemented method of claim 1, further comprising:
   receiving input data associated with an unstructured data set; and
   generating, using the second model, output data based at least in part on the input data.

5. The computer-implemented method of claim 1, further comprising:
   increasing a learning rate of the second model upon freezing the first model.

6. The computer-implemented method of claim 1, further comprising:
   unfreezing the first model integrated into the second model; and
   decreasing the learning rate of the second model.

7. The computer-implemented method of claim 1, wherein the first data set comprises waste and error data and wherein the second data set comprises fraud data.

8. A system comprising memory and one or more processors communicatively coupled to the memory, the one or more processors configured to: integrate a first model into a second model by connecting one or more layers of the first model to one or more layers of the second model, wherein the first model is initially trained based at least in part on a first data set that is associated with a first model domain;
   train a first portion of the second model based at least in part on the first data set;
   freeze the first model integrated into the second model; and
   train a second portion of the second model based at least in part on a second data set that is associated with a second model domain different than the first model domain.

9. The computing system of claim 8, wherein the instructions further configure the apparatus to:
   unfreeze the first model integrated into the second model; and
   fine-tune the second model based at least in part on the second data set.

10. The computing system of claim 8, wherein the instructions further configure the apparatus to:
    store the second model.

11. The computing system of claim 8, wherein the instructions further configure the apparatus to:
    receive input data associated with an unstructured data set; and
    generate, using the second model, output data based at least in part on the input data.

12. The computing system of claim 8, wherein the instructions further configure the apparatus to:
    increase a learning rate of the second model upon freezing the first model.

13. The computing system of claim 8, wherein the instructions further configure the apparatus to:
    unfreeze the first model integrated into the second model; and
    decrease the learning rate of the second model.

14. The computing system of claim 8, wherein the first data set comprises a waste & error data and wherein the second data set comprises fraud data.

15. One or more non-transitory computer-readable storage media including instructions that, when executed by one or more processors, cause the one or more processors to:
- integrate a first model into a second model by connecting one or more layers of the first model to one or more layers of the second model, wherein the first model is initially trained based at least in part on a first data set that is associated with a first model domain;
- train a first portion of the second model based at least in part on the first data set;
- freeze the first model integrated into the second model; and
- train a second portion of the second model based at least in part on a second data set that is associated with a second model domain different than the first model domain.

16. The one or more non-transitory computer-readable storage media of claim 15, wherein the one or more processors are further caused to:
- unfreeze the first model integrated into the second model; and
- fine-tune the second model based at least in part on the second data set.

17. The one or more non-transitory computer-readable storage media of claim 15, wherein the one or more processors are further caused to:
- store the second model.

18. The one or more non-transitory computer-readable storage media of claim 15, wherein the one or more processors are further caused to:
- receive input data associated with an unstructured data set; and
- generate, using the second model, output data based at least in part on the input data.

19. The one or more non-transitory computer-readable storage media of claim 15, wherein the one or more processors are further caused to:
- increase a learning rate of the second model upon freezing the first model.

20. The one or more non-transitory computer-readable storage media of claim 19, wherein the one or more processors are further caused to:
- unfreeze the first model integrated into the second model; and
- decrease the learning rate of the second model.

* * * * *

UNITED STATES PATENT AND TRADEMARK OFFICE
CERTIFICATE OF CORRECTION

Page 1 of 2

PATENT NO. : 12,271,395 B2
APPLICATION NO. : 18/153602
DATED : April 8, 2025
INVENTOR(S) : Colum Foley et al.

It is certified that error appears in the above-identified patent and that said Letters Patent is hereby corrected as shown below:

In the Claims

In Column 58, Lines 28-32, Claim 8, delete "integrate a first model into a second model by connecting one or more layers of the first model to one or more layers of the second model, wherein the first model is initially trained based at least in part on a first data set that is associated with a first model domain;" and insert the same at Line 29, as a new sub point.

In Column 58, Line 41, Claim 9, delete "The computing system" and insert -- The system --, therefor.

In Column 58, Lines 41-42, Claim 9, delete "instructions further configure the apparatus to:" and insert -- one or more processors are further configured to: --, therefor.

In Column 58, Line 47, Claim 10, delete "The computing system" and insert -- The system --, therefor.

In Column 58, Lines 47-48, Claim 10, delete "instructions further configure the apparatus to:" and insert -- one or more processors are further configured to: --, therefor.

In Column 58, Line 50, Claim 11, delete "The computing system" and insert -- The system --, therefor.

In Column 58, Lines 50-51, Claim 11, delete "instructions further configure the apparatus to:" and insert -- one or more processors are further configured to: --, therefor.

In Column 58, Line 56, Claim 12, delete "The computing system" and insert -- The system --, therefor.

In Column 58, Lines 56-57, Claim 12, delete "instructions further configure the apparatus to:" and insert -- one or more processors are further configured to: --, therefor.

In Column 58, Line 60, Claim 13, delete "The computing system" and insert -- The system --, therefor.

In Column 58, Line 60, Claim 13, delete "claim 8," and insert -- claim 12, --, therefor.

Signed and Sealed this
Twenty-ninth Day of July, 2025

Coke Morgan Stewart
*Acting Director of the United States Patent and Trademark Office*

In Column 58, Lines 60-61, Claim 13, delete "instructions further configure the apparatus to:" and insert -- one or more processors are further configured to: --, therefor.

In Column 58, Line 65, Claim 14, delete "The computing system" and insert -- The system --, therefor.